(12) United States Patent
Ozcan et al.

(10) Patent No.: US 12,038,370 B2
(45) Date of Patent: Jul. 16, 2024

(54) MAGNETICALLY MODULATED COMPUTATIONAL CYTOMETER AND METHODS OF USE

(71) Applicant: THE REGENTS OF THE UNIVERSITY OF CALIFORNIA, Oakland, CA (US)

(72) Inventors: Aydogan Ozcan, Los Angeles, CA (US); Aniruddha Ray, Los Angeles, CA (US); Yibo Zhang, Los Angeles, CA (US); Dino Di Carlo, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 289 days.

(21) Appl. No.: 17/621,979

(22) PCT Filed: Jul. 2, 2020

(86) PCT No.: PCT/US2020/040664
§ 371 (c)(1),
(2) Date: Dec. 22, 2021

(87) PCT Pub. No.: WO2021/003369
PCT Pub. Date: Jan. 7, 2021

(65) Prior Publication Data
US 2022/0260481 A1   Aug. 18, 2022

Related U.S. Application Data

(60) Provisional application No. 62/869,726, filed on Jul. 2, 2019.

(51) Int. Cl.
*G01N 15/1433* (2024.01)
*B03C 1/01* (2006.01)
(Continued)

(52) U.S. Cl.
CPC .......... *G01N 15/1433* (2024.01); *B03C 1/01* (2013.01); *B03C 1/02* (2013.01); *G01N 15/1434* (2013.01);
(Continued)

(58) Field of Classification Search
None
See application file for complete search history.

(56) References Cited

U.S. PATENT DOCUMENTS 6,033,574 A    3/2000  Siddiqi
7,764,821 B2   7/2010  Coumans et al.
(Continued)

FOREIGN PATENT DOCUMENTS

WO    2011/049965    4/2011
WO    2011/139641    11/2011
(Continued)

OTHER PUBLICATIONS

PCT International Search Report for PCT/US2020/040664, Applicant: The Regents of the University of California, Form PCT/ISA/210 and 220, dated Sep. 30, 2020 (3 pages).
(Continued)

*Primary Examiner* — Anand P Bhatnagar
(74) *Attorney, Agent, or Firm* — VISTA IP LAW GROUP LLP

(57) ABSTRACT

A computational cytometer operates using magnetically modulated lensless speckle imaging, which introduces oscillatory motion to magnetic bead-conjugated rare cells of interest through a periodic magnetic force and uses lensless time-resolved holographic speckle imaging to rapidly detect the target cells in three-dimensions (3D). Detection specificity is further enhanced through a deep learning-based classifier that is based on a densely connected pseudo-3D convolutional neural network (P3D CNN), which automati-
(Continued)

cally detects rare cells of interest based on their spatio-temporal features under a controlled magnetic force. This compact, cost-effective and high-throughput computational cytometer can be used for rare cell detection and quantification in bodily fluids for a variety of biomedical applications.

20 Claims, 13 Drawing Sheets

(51) Int. Cl.
    *B03C 1/02*     (2006.01)
    *G01N 15/1434*     (2024.01)
    *G03H 1/00*     (2006.01)
    *G06V 10/147*     (2022.01)
    *G06V 10/82*     (2022.01)
    *G06V 20/69*     (2022.01)
    *G01N 15/01*     (2024.01)
    *G01N 15/10*     (2006.01)

(52) U.S. Cl.
    CPC ......... *G03H 1/0005* (2013.01); *G06V 10/147* (2022.01); *G06V 10/82* (2022.01); *G06V 20/693* (2022.01); *G06V 20/698* (2022.01); B03C 2201/18 (2013.01); B03C 2201/26 (2013.01); *G01N 15/01* (2024.01); G01N 2015/1006 (2013.01); G03H 2001/005 (2013.01); G03H 2222/12 (2013.01)

(56) References Cited

U.S. PATENT DOCUMENTS

| | | | |
|---|---|---|---|
| 8,693,762 B2 | 4/2014 | Di Carlo et al. | |
| 8,842,901 B2 | 9/2014 | Ozcan et al. | |
| 8,866,063 B2 | 10/2014 | Ozcan et al. | |
| 8,916,390 B2 | 12/2014 | Ozcan et al. | |
| 9,007,433 B2 | 4/2015 | Ozcan et al. | |
| 9,057,702 B2 | 6/2015 | Ozcan et al. | |
| 9,170,412 B2* | 10/2015 | Turgeman ............ | G02B 21/367 |
| 9,331,113 B2 | 5/2016 | Ozcan et al. | |
| 9,605,941 B2* | 3/2017 | Ozcan ................ | G01B 9/02041 |
| 9,683,938 B2 | 6/2017 | Ozcan et al. | |
| 9,715,099 B2 | 7/2017 | Ozcan et al. | |
| 9,767,341 B2 | 9/2017 | Ozcan et al. | |
| 10,267,736 B2 | 4/2019 | Lo et al. | |
| 10,295,451 B2 | 5/2019 | Schneider et al. | |
| 10,663,466 B2 | 5/2020 | Ozcan et al. | |
| 10,775,602 B2* | 9/2020 | Duocastella ........... | H04N 23/67 |
| 10,795,315 B2 | 10/2020 | Ozcan et al. | |
| 11,789,016 B2* | 10/2023 | Lionberger ........ | G01N 33/6854 435/7.1 |
| 2012/0063664 A1 | 3/2012 | Di Carlo et al. | |
| 2012/0148141 A1 | 6/2012 | Ozcan et al. | |
| 2012/0157160 A1 | 6/2012 | Ozcan et al. | |
| 2012/0218379 A1 | 8/2012 | Ozcan et al. | |
| 2012/0248292 A1 | 10/2012 | Ozcan et al. | |
| 2013/0092821 A1 | 4/2013 | Ozcan et al. | |
| 2013/0122513 A1* | 5/2013 | Petersson ............... | G01N 27/74 435/7.1 |
| 2013/0203043 A1 | 8/2013 | Ozcan et al. | |
| 2013/0280752 A1* | 10/2013 | Ozcan ................ | G01B 9/02041 356/482 |
| 2014/0015953 A1* | 1/2014 | Turgeman .......... | G02B 21/0052 359/811 |
| 2014/0120563 A1 | 5/2014 | Ozcan et al. | |
| 2015/0111201 A1 | 4/2015 | Ozcan et al. | |
| 2015/0204773 A1 | 7/2015 | Ozcan et al. | |
| 2016/0070092 A1 | 3/2016 | Ozcan et al. | |
| 2016/0161409 A1 | 6/2016 | Ozcan et al. | |
| 2016/0327473 A1 | 11/2016 | Ozcan et al. | |
| 2016/0334614 A1 | 11/2016 | Ozcan et al. | |
| 2017/0153106 A1* | 6/2017 | Ozcan ..................... | G03H 1/02 |
| 2017/0160197 A1 | 6/2017 | Ozcan et al. | |
| 2017/0168285 A1 | 6/2017 | Ozcan et al. | |
| 2017/0220000 A1 | 8/2017 | Zcan et al. | |
| 2018/0052425 A1 | 2/2018 | Ozcan et al. | |
| 2018/0196193 A1 | 7/2018 | Ozcan et al. | |
| 2018/0373921 A1 | 12/2018 | Di Carlo et al. | |
| 2019/0054466 A1* | 2/2019 | Gershtein ......... | B01L 3/502715 |
| 2019/0056384 A1* | 2/2019 | Gershtein .......... | G01N 15/1436 |
| 2019/0137932 A1 | 5/2019 | Ozcan et al. | |
| 2019/0294108 A1 | 9/2019 | Ozcan et al. | |
| 2019/0316172 A1 | 10/2019 | Ozcan et al. | |
| 2019/0346369 A1 | 11/2019 | Ozcan et al. | |
| 2020/0103328 A1 | 4/2020 | Ozcan et al. | |
| 2020/0142174 A1* | 5/2020 | Duocastella ......... | G02B 21/365 |
| 2020/0340901 A1 | 10/2020 | Ozcan et al. | |
| 2020/0393359 A1 | 12/2020 | Ozcan et al. | |
| 2020/0393793 A1 | 12/2020 | Ozcan et al. | |
| 2021/0181673 A1 | 6/2021 | Ozcan et al. | |
| 2021/0209337 A1 | 7/2021 | Ozcan et al. | |
| 2021/0285864 A1 | 9/2021 | Ozcan et al. | |
| 2022/0274109 A1* | 9/2022 | Gershtein .......... | G01N 15/1459 |

FOREIGN PATENT DOCUMENTS

| | | |
|---|---|---|
| WO | 2012/082776 | 6/2012 |
| WO | 2012/088351 | 6/2012 |
| WO | 2012/094523 | 7/2012 |
| WO | 2013/070287 | 5/2013 |
| WO | 2013/119266 | 8/2013 |
| WO | 2014/012031 | 1/2014 |
| WO | 2014/099629 | 6/2014 |
| WO | 2015/017046 | 2/2015 |
| WO | 2015/108820 | 7/2015 |
| WO | 2016/019324 | 2/2016 |
| WO | 2016/118884 | 7/2016 |
| WO | 2016/205736 | 12/2016 |
| WO | 2017/196995 | 11/2017 |
| WO | 2017/205530 | 11/2017 |
| WO | 2018/057972 | 3/2018 |
| WO | 2018/102346 | 6/2018 |
| WO | 2018/136474 | 7/2018 |
| WO | 2018/165590 | 9/2018 |
| WO | 2019/103909 | 5/2019 |
| WO | 2019/236569 | 12/2019 |
| WO | 2020/082029 | 4/2020 |
| WO | 2020/082030 | 4/2020 |
| WO | 2020/117864 | 6/2020 |
| WO | 2020/219468 | 10/2020 |
| WO | 2020/242993 | 12/2020 |
| WO | 2021/021906 | 2/2021 |
| WO | 2021/154876 | 8/2021 |

OTHER PUBLICATIONS

PCT Written Opinion of the International Search Authority for PCT/US2020/040664, Applicant: The Regents of the University of California, Form PCT/ISA/237, dated Sep. 30, 2020 (7 pages).
Yuchao Chen et al., Rare cell isolation and analysis in microfluidics, Lab Chip. Feb. 21, 2014; 14(4): 626-645.
Zoltán Göröcs et al., A deep learning-enabled portable imaging flow cytometer for cost-effective, high-throughput, and label-free analysis of natural water samples, Light: Science & Applications (2018) 7:66.
Alon Greenbaum et al., Wide-field computational imaging of pathology slides using lens-free on-chip microscopy, www.ScienceTranslationalMedicine.org, Dec. 17, 2014, vol. 6, Issue 267, 267ra175.
Alon Greenbaum et al., Maskless imaging of dense samples using pixel super-resolution based multi-height lensfree on-chip microscopy, Optics Express, Jan. 30, 2012, vol. 20, No. 3, 3129-3143.
Alon Greenbaum et al., Increased space-bandwidth product in pixel super-resolved lensfree on-chip microscopy, Scientific Reports, 3:1717, DOI: 10.1038/srep01717 (2013).
Geon Kima et al., Rapid label-free identification of pathogenic bacteria species from a minute quantity exploiting three-

(56) References Cited

OTHER PUBLICATIONS dimensional quantitative phase imaging and artificial neural network, bioRxiv preprint doi: https://doi.org/10.1101/596486; this version posted Jun. 23, 2021.

Wei Luo et al., Synthetic aperture-based on-chip microscopy, Light: Science & Applications (2015) 4, e261; doi:10.1038/lsa.2015.34.

Wei Luo et al., Pixel super-resolution using wavelength scanning, Light: Science & Applications (2016) 5, e16060; doi:10.1038/lsa.2016.60.

Zhaofan Qiu et al., Learning Spatio-Temporal Representation with Pseudo-3D Residual Networks, arXiv:1711.10305v1 [cs.CV] Nov. 28, 2017.

B. Srinivasa Reddy et al., An FFT-Based Technique for Translation, Rotation, and Scale-Invariant Image Registration, IEEE Transactions on Image Processing, vol. 5, No. 8, Aug. 1996, 1266-1271.

AmirAli H. Talasaza et al., Isolating highly enriched populations of circulating epithelial cells and other rare cells from blood using a magnetic sweeper device, PNAS, Mar. 10, 2009, vol. 106, No. 10, 3970-3975.

Lihua Wang, PhD et al., Promise and Limits of the CellSearch® Platform for Evaluating Pharmacodynamics in Circulating Tumor Cells (CTC), Semin Oncol., Aug. 2016 ; 43(4): 464-475.

Yichen Wu et al., Label-free bio-aerosol sensing using mobile microscopy and deep learning, ACS Photonics, DOI: 10.1021/acsphotonics.8b01109, Publication Date (Web): Oct. 4, 2018.

Maciej Zborowski et al., Rare Cell Separation and Analysis by Magnetic Sorting, Anal. Chem. 2011, 83, 8050-8056, dx.doi.org/10.1021/ac200550d.

Yibo Zhang et al., Wide-field imaging of birefringent synovial fluid crystals using lens-free polarized microscopy for gout diagnosis, Scientific Reports, 6:28793, DOI: 10.1038/srep28793.

Yibo Zhang et al., Motility-based label-free detection of parasites in bodily fluids using holographic speckle analysis and deep learning, Light: Science & Applications (2018) 7:108.

PCT International Preliminary Report on Patentability (Chapter I of the Patent Cooperation Treaty) for PCT/US2020/040664, Applicant: The Regents of the University of California, Form PCT/IB/326 and 373, dated Jan. 13, 2022 (9 pages).

\* cited by examiner

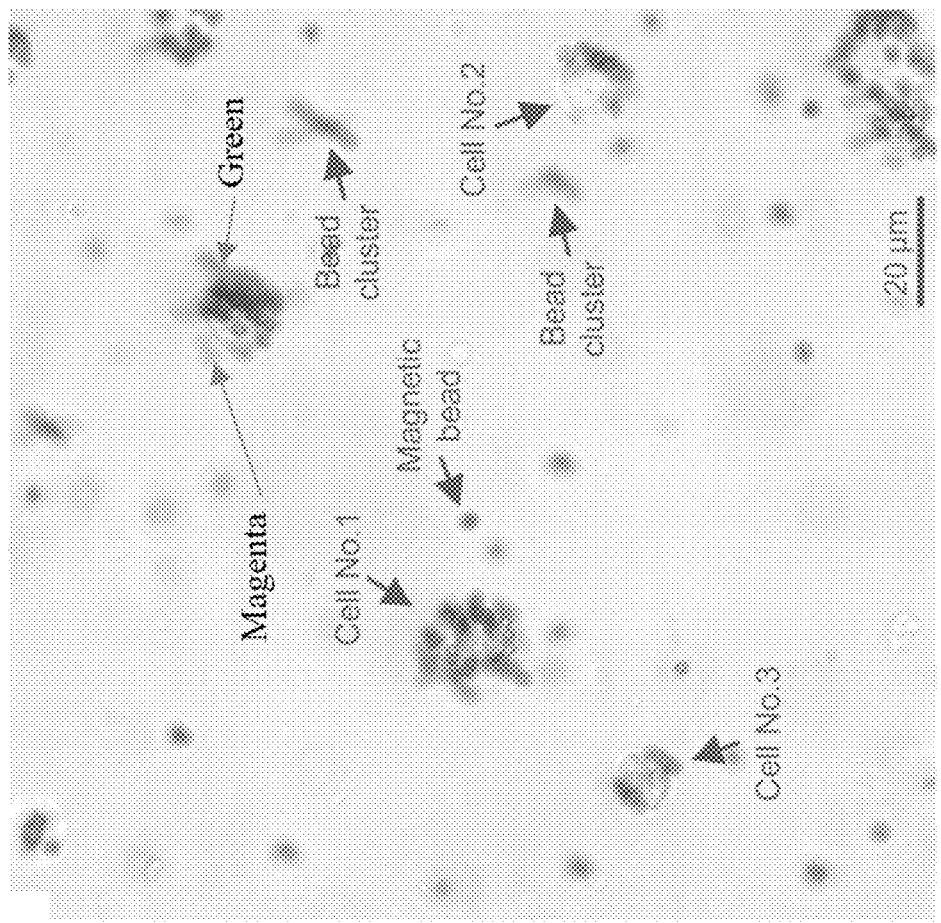
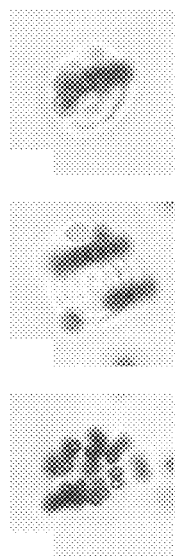
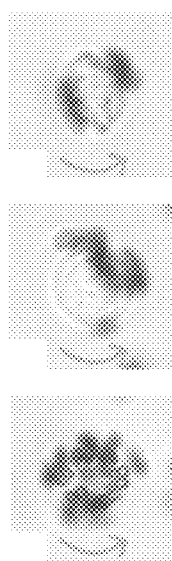
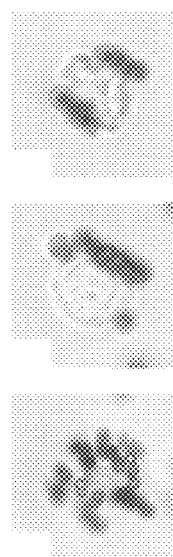
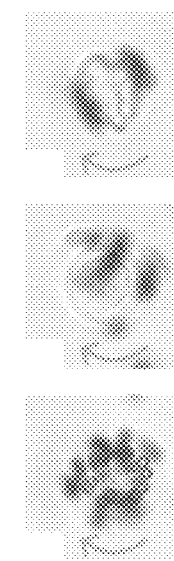
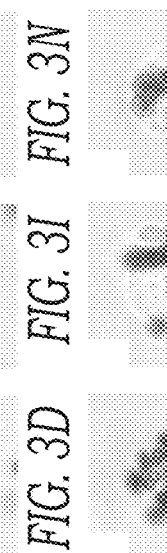
FIG. 3A – FIG. 3P

Preliminary screening: drift correction and selection of target cell candidates

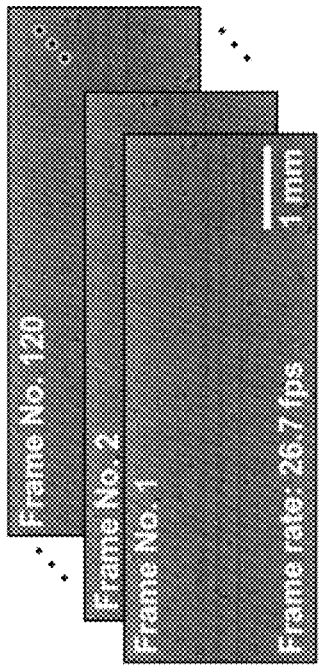

FIG. 4A
Raw images acquired by the image sensor

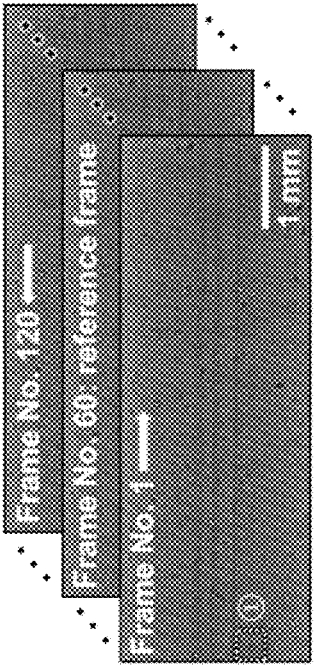

FIG. 4B
Computational drift correction

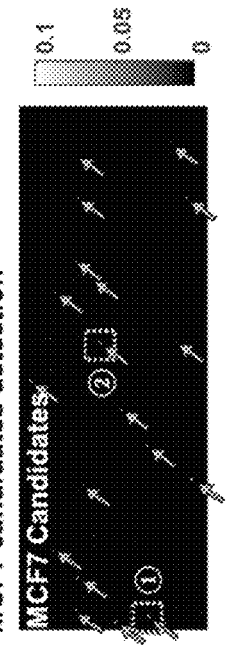

FIG. 4C
MCF7 candidates detection

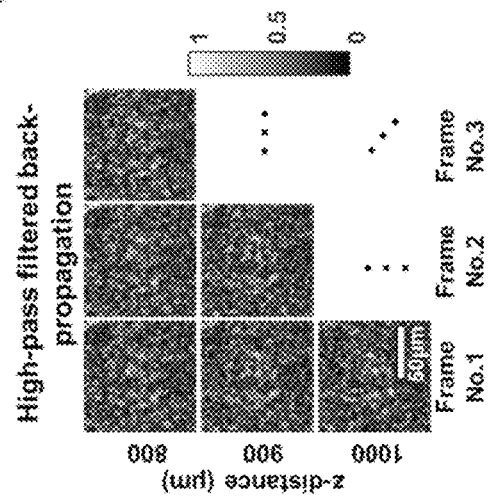

FIG. 4D
Computational drift correction

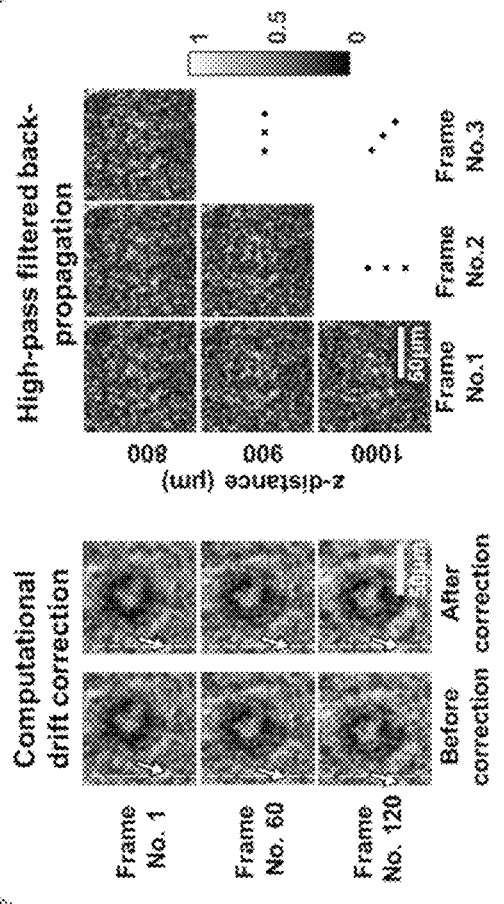

FIG. 4E
High-pass filtered back-propagation

Zoomed-in preprocessing with MCF7 candidate ①

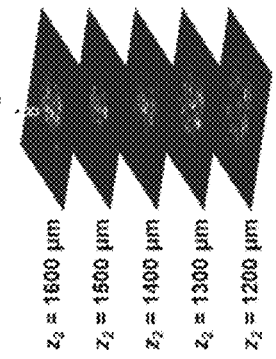

FIG. 4F
Computational motion analysis

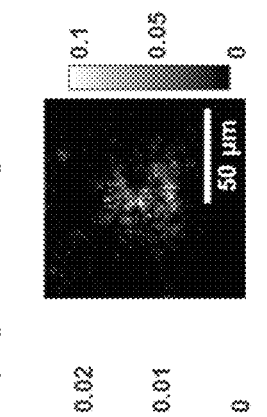

FIG. 4G
Maximum intensity projection along z direction

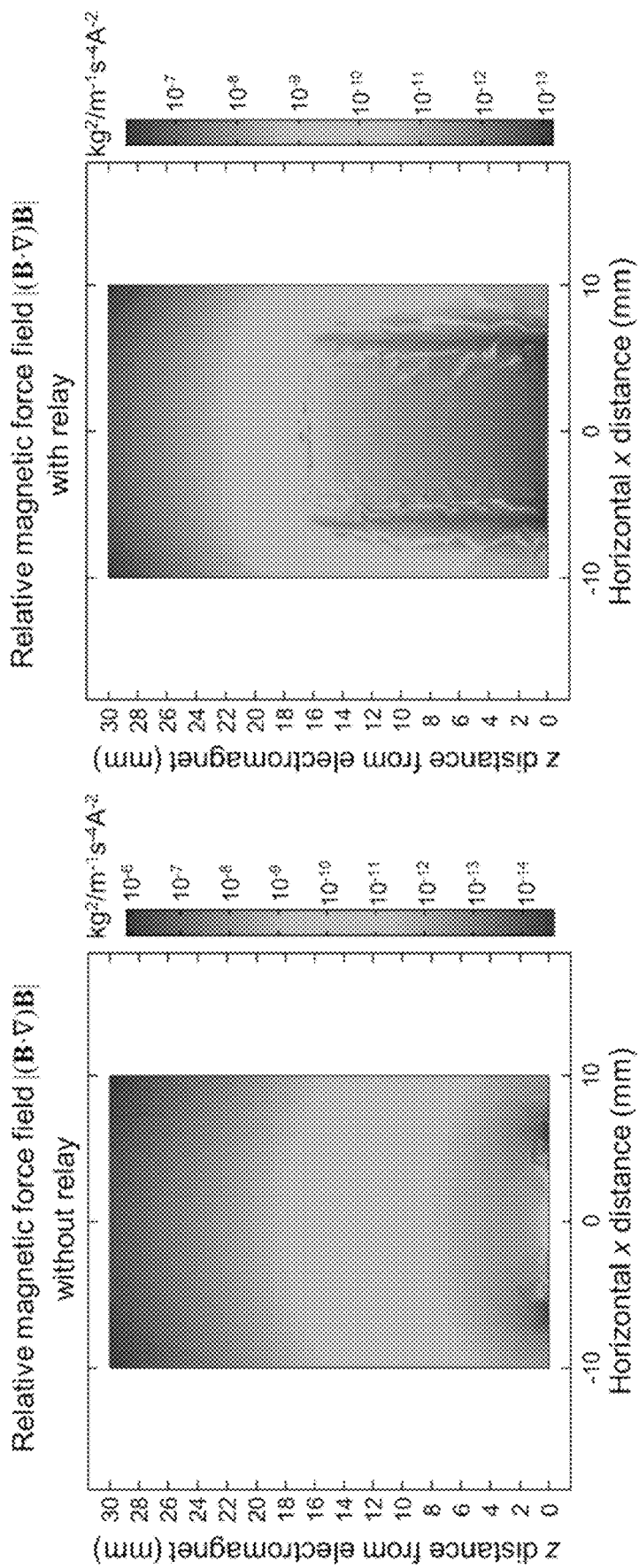

MAGNETICALLY MODULATED COMPUTATIONAL CYTOMETER AND METHODS OF USE

RELATED APPLICATION

This Application is a U.S. National Stage filing under 35 U.S.C. § 371 of International Application No. PCT/US2020/040664, filed on Jul. 2, 2020, which claims priority to U.S. Provisional Patent Application No. 62/869,723 filed on Jul. 2, 2019, which are hereby incorporated by reference. Priority is claimed pursuant to 35 U.S.C. §§ 119, 371 and any other applicable statute.

TECHNICAL FIELD

The technical field generally to cytometer devices used to detect objects such as rare cells within bodily fluids such as rare cancer cells within blood. More specifically, the field of the invention relates to a computation cytometer based on magnetically modulated lensless speckle imaging, which introduces oscillatory motion to the magnetic particle/bead-conjugated rare cells of interest through a periodic magnetic force, and uses lensless time-resolved holographic speckle imaging to rapidly detect the target cells in three-dimensions (3D).

BACKGROUND

Rare cell detection aims to identify enough low-abundant cells within a vast majority of background cells, which typically requires the processing of large volumes of biological sample. The detection and enumeration of these rare cells is vital for disease diagnostics, evaluation of disease progression, and characterization of immune response. For instance, circulating fetal cells presented in maternal blood are recognized as a source of fetal genomic DNA, and their isolation is crucial for the implementation of routine prenatal diagnostic testing. As another example, antigen-specific T cells in peripheral blood play a central role in mediating immune response and the formation of immunological memory, which could lead to the prediction of immune protection and diagnosis of immune-related diseases. Circulating endothelial cells with a mature phenotype are increased in patients with certain types of cancer and several pathological conditions, indicating their potential as disease markers. Circulating tumor cells (CTCs) are implicated in various stages of cancer, and therefore have been collected to study their role in the metastatic cascade and to predict patient outcomes from both the disease and treatments received. To highlight yet another example, hematopoietic stem and progenitor cells, which reside predominantly in bone marrow with low numbers, also found in peripheral blood, possess the unique capacity for self-renewal and multilineage differentiation and their trafficking in blood may connect to disease processes.

Specific and sensitive detection of such rare cells in human blood and other bodily fluids is therefore of great interest. However, millions of events need to be acquired to obtain a sufficient number of these low-abundance cells (e.g., typically <1000 target cells per milliliter of blood). The direct detection of rare cells from whole blood requires the processing of large amounts of patient sample (e.g., up to a few hundred milliliters), which is both unrealistic and time-consuming. To alleviate this issue, highly specific labeling methods are often used before detection for sample purification/enrichment in order to facilitate rapid detection and processing. Among these labeling techniques, the use of colloidal magnetic particles as labeling reagents offers benefits in forming stable suspensions, fast reaction kinetics, and minimum damage to the target cells with high viability retained.

Motivated by these important needs and the associated challenges, various technologies have been developed and employed for detecting rare cells in blood. Most of these existing detection methods involve three steps, namely capture, enrichment and detection. The capture and enrichment steps use several methods such as barcoded particles, magnetic beads, micro-machines, microfluidic chips, and density gradient centrifugation. Following the enrichment step, these rare cells can be detected via commonly used techniques such as immunofluorescence, electrical impedance, and Raman scattering measurements, among others. Notably, commercial products for rare cell detection such as the CELLSEARCH® system, which automates magnetic labeling, isolation, fluorescence labeling, and automated counting, are generally expensive, limiting their adoption worldwide. Therefore, cost-effective, reliable and high-throughput rare cell detection techniques are urgently needed to improve the early diagnosis of diseases, including cancer, so that earlier treatments can be carried out, helping to improve patient outcomes while also reducing healthcare costs.

SUMMARY

Powered by deep learning, a computational cytometer is disclosed that uses speckle imaging with lensless chip-scale microscopy that can be employed for specific and sensitive detection of rare cells in blood with low cost and high throughput. This cell detection and cytometry platform and technique is based on magnetically modulated lensless speckle imaging, which specifically labels rare cells of interest using magnetic particles attached to surface markers of interest and generates periodic and well-controlled motion on target cells by alternating an external magnetic field that is applied to a large sample volume. The holographic diffraction and the resulting speckle or diffraction patterns of the moving cells are then captured using a compact and cost-effective on-chip lensless imager and are computationally analyzed by a deep learning-based algorithm to rapidly detect and accurately identify the rare cells of interest in a high-throughput manner based on their unique spatio-temporal features.

In one embodiment, the computational cytometer uses a magnetically modulated speckle imaging module that includes a lensless in-line holographic microscope and two oppositely positioned electromagnets. The lensless microscope contains a laser diode (650 nm wavelength) to illuminate the sample from ~5-10 cm above the sample, and a complementary metal-oxide-semiconductor (CMOS) image sensor is placed ~1 mm below the sample for acquisition of a high-frame-rate video to monitor the spatio-temporal evolution of the sample containing the target cells of interest. Because the light-source-to-sample distance is much greater than the sample-to-image-sensor distance, the optical design has a unit magnification, and the field of view (FOV) of a single image is equal to the active area of the image sensor (which can be around 10-30 mm$^2$ using standard CMOS imagers employed in digital cameras and mobile phones). To increase the screening throughput, target cells are enriched using a magnetic separation operation and loaded inside a capillary tube for imaging.

Magnetic enrichment alone leads to a background of unlabeled cells, bead clusters, or weakly labeled cells that are also captured, such that further discrimination of target cells within this background information is needed in order to accurately identify and count rare cells. In one embodiment, the imaging module is mounted onto a linear translation stage and is translated along the direction of the sample tube to capture a holographic video for each section of the sample tube. During the imaging at each section, the electromagnets are supplied with alternating current with a 180° phase difference between the electromagnets to exert an alternating pulling force to the magnetic bead-conjugated cells in the sample, which causes them to oscillate at the same frequency as the driving current. Rods made of permalloy were designed and utilized to enhance the magnetic force at the sample location by ~40-fold. The holographic diffraction patterns that are cast by the magnetically modulated target cells are captured using the image sensor and are transferred to a computing device such as a laptop computer. A computational motion analysis (CMA) algorithm executed by software on the computing device and a densely connected pseudo-3D convolutional neural network structure (P3D CNN) (also executed by the computing device) then analyze the holographic image sequence that contains the 3D dynamic information from the oscillating cells, which allows rapid and specific detection of the target cells.

The tested prototype was used to screen ~0.942 mL of fluid sample, corresponding to ~1.177 mL of whole blood sample before enrichment, in ~7 min, while the components cost only around $750 (excluding the function generator, power supply and laptop computer) and weighing ~2.1 kg. The platform with a single imaging channel can be expanded to parallel imaging channels by mounting several imaging modules onto the same linear stage, as shown in FIG. 1A.

The performance of this platform was tested by detecting a model rare cell system of spiked MCF7 cancer cells in human blood. The platform described herein has a limit of detection (LoD) of 10 cells per mL of whole blood using only a single imaging channel. Because the current LoD is mainly limited by the screening volume, the LoD can be further improved by including additional parallel imaging channels (i.e., capillaries or sample holders) and increasing the sample volume that is screened.

In one embodiment, a cytometer device is provided that includes one or more optically transparent sample holders configured to hold a volume of sample therein containing one or more objects therein with at least some of the one or more objects containing magnetic particles bound or conjugated thereto. A moveable scanning head (or multiple scanning heads in some embodiments) is disposed adjacent to the one or more optically transparent sample holders, the moveable scanning head having a lensless imaging module that includes one or more illumination sources configured to illuminate the sample holder from a first side and an image sensor disposed on a second side of the sample holder, the image sensor configured to capture a plurality diffraction patterns created by one or more objects within the sample volume. The moveable scanning head further includes first and second electromagnets located laterally adjacent to the lensless imaging module. Optional permalloy rods are associated with each electromagnet to increase the magnetic field strength on the sample. A translation stage is coupled to the moveable scanning head and configured to move the moveable scanning head along different regions of the optically transparent sample holder. This enables images or movies to be obtained of the sample while the magnetic field is applied to sample volume.

The cytometer further includes, in one embodiment, a computing device operatively connected to the cytometer device and configured to receive a plurality of images or video obtained by the image sensor. The computing device executes or runs image processing software configured to identify candidate objects of interest and classify the objects of interest as a target object of interest or not a target object of interest. In one embodiment, the image processing software performs drift correction prior to identifying candidate objects of interest. In another embodiment, the image processing software inputs a plurality of images or video to a trained neural network to classify the objects of interest. The computing device may also be used to run and/or operate aspects of the cytometer device. This includes activation of the one or more light sources, capturing, transferring and/or storing image files, movement of the scanning head(s), operation and actuation of the electromagnetic, etc.

In another embodiment, a method of identifying one or more target objects among non-target objects within a sample includes conjugating the one or more target objects with one or more magnetic particles; loading an optically transparent sample holder with a sample containing the conjugated target object(s) and non-target objects; applying an alternating magnetic field to the sample holder containing the sample; illuminating the optically transparent sample holder with illumination from one or more light sources and capturing a plurality of images or video of diffraction patterns generated by the target object(s) and non-target objects within the sample while the alternating magnetic field is applied; subjecting the plurality of images or video to image processing to identify candidate target object(s) and generate a plurality of images or video of the candidate target object(s) that are input to trained neural network or machine learning algorithm that outputs the classification of the candidate target object(s) as a target object or non-target object.

BRIEF DESCRIPTION OF THE DRAWINGS

FIG. 1A further illustrates a magnetically modulated lensless imaging module (inset) and includes one or more illumination sources and an image sensor and two electromagnets driven by alternating current with opposite phase. The lensless imaging module and the two electromagnetics may be contained in a moveable scanning head as illustrated. The fluid sample that contains magnetic bead-conjugated cells of interest (or other objects) is loaded into a capillary tube or other sample holder. The imaging module along with the two electromagnets is mounted to a translation stage to scan along the capillary tube to record holographic images of each section of the tube.

FIG. 1B shows in inset an image of the two electromagnets and respective rods that are located on either side of the sample holder (e.g., capillary tube). The scanning head is removed to better illustrate the configuration of the electromagnets adjacent to the capillary tube.

FIGS. 3A-3P illustrates Dynabead®-conjugated MCF7 cells undergoing periodic rotational motion under alternating magnetic force field. Images were acquired using a 40×0.6NA benchtop microscope. Image panels in FIGS. 3A-3O include snapshots of three Dynabead®-conjugated MCF7 cells at different time points within a period of oscillation (period=1 s). Image panel in FIG. 3P shows a fused microscope image obtained from images taken at the two extrema of the oscillation (t=0.5 s and t=1.0 s) to demonstrate the movement, where the gray regions in the fused image represent the consistency between the two images, and the magenta/green colors (identified by arrows) represent the difference of the two images. The magenta color represents the first image (t=0.5 s), and the green color represents the second image (t=1.0 s).

FIGS. 4A-4K illustrate the steps or operations of computational detection of rare cells according to one embodiment. FIGS. 4A-4C illustrate the preliminary screening for the whole FOV to detect candidates for target cells (MCF7). At each scanning position, 120 frames of raw holograms were taken at 26.7 frames per second. Computational drift correction was applied to mitigate the horizontal shift caused by the fluid drift, where the vertical movement caused by the magnetic field was kept unmodified. The lateral position of each MCF7 candidate was located by computational motion analysis (CMA), maximum intensity projection and threshold-based detection. FIGS. 4D-4G are zoomed-in preliminary processing for the example region marked with ① in FIGS. 4B-4C. FIGS. 4H-4K illustrate a classification process for two cell candidates marked with ① and ② in FIG. 4C. The axial location for each cell candidate was determined by autofocusing (FIG. 4H). A video was formed for each cell candidate by propagating each frame to the in-focus plane (FIG. 4I). The classification was performed by the trained neural network which was a densely connected P3D convolutional neural network (FIG. 4J). FIG. 4K illustrates the final result for each candidate object (true or false determination).

FIGS. 7A-7D illustrate COMSOL simulation of magnetic force field generated by electromagnets with respective permalloy relay. FIG. 7A is a 3D schematic of the permalloy relays relative to the electromagnets. FIGS. 7B-7D illustrate simulation of the relative (unitless) magnitude of the magnetic force field that is generated by a single electromagnet with (FIG. 7D) or without (FIG. 7C) permalloy relay, as a function of the spatial position. The relay significantly increases the magnetic force field for a given axial distance from the electromagnet (FIG. 7D).

DETAILED DESCRIPTION OF THE ILLUSTRATED EMBODIMENTS

Figure 1A:
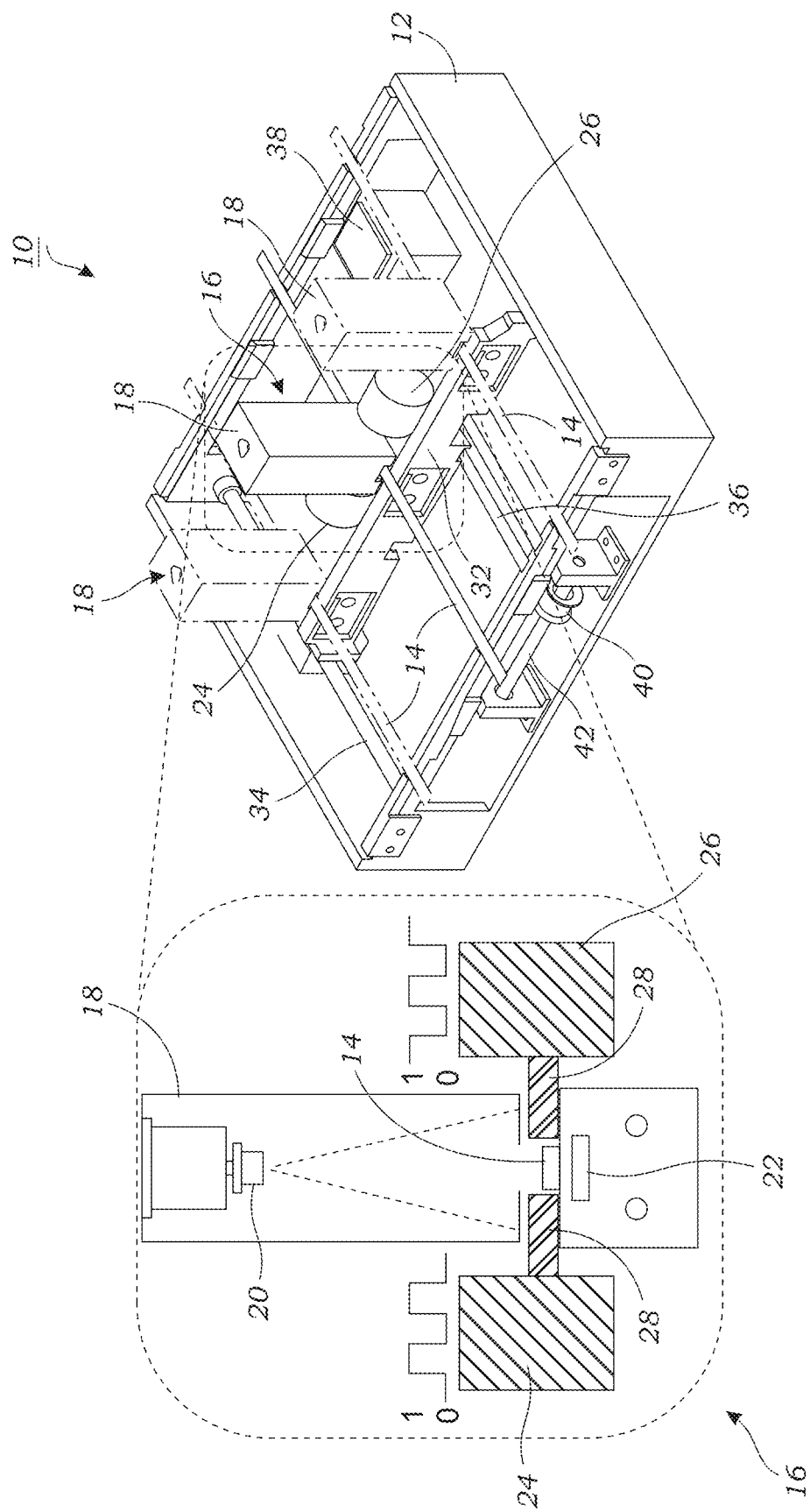
FIG. 1A illustrates a perspective view of the computational cytometer.
Figure 1B:
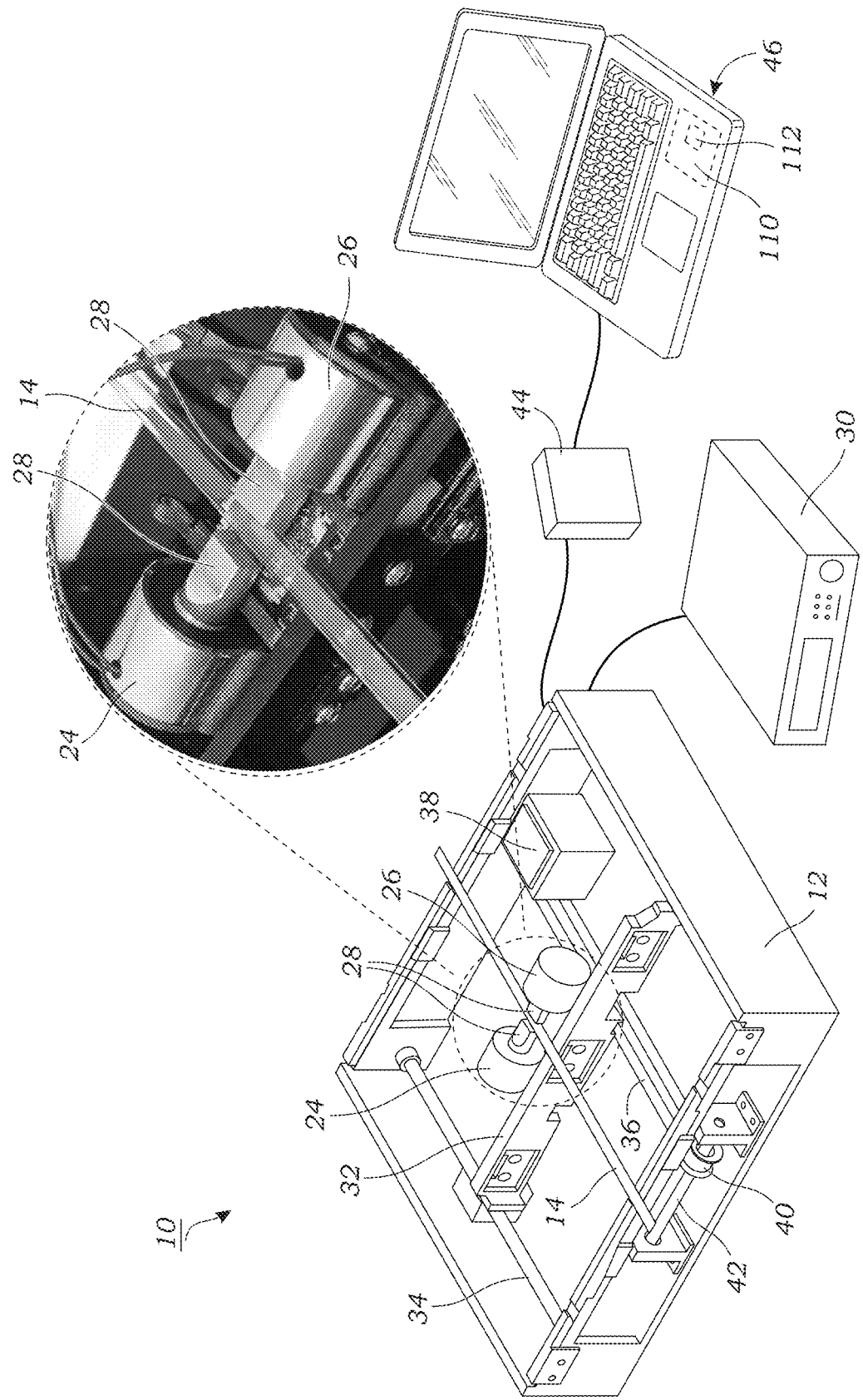
FIG. 1B illustrates another perspective view of the computation cytometer along with a computing device (e.g., a laptop computer) that is used to control the device and acquire image data. A function generator and a power supply together with custom-designed circuitry are used to provide the power and driving current for the translation stage and electromagnets.
Figure 1C:
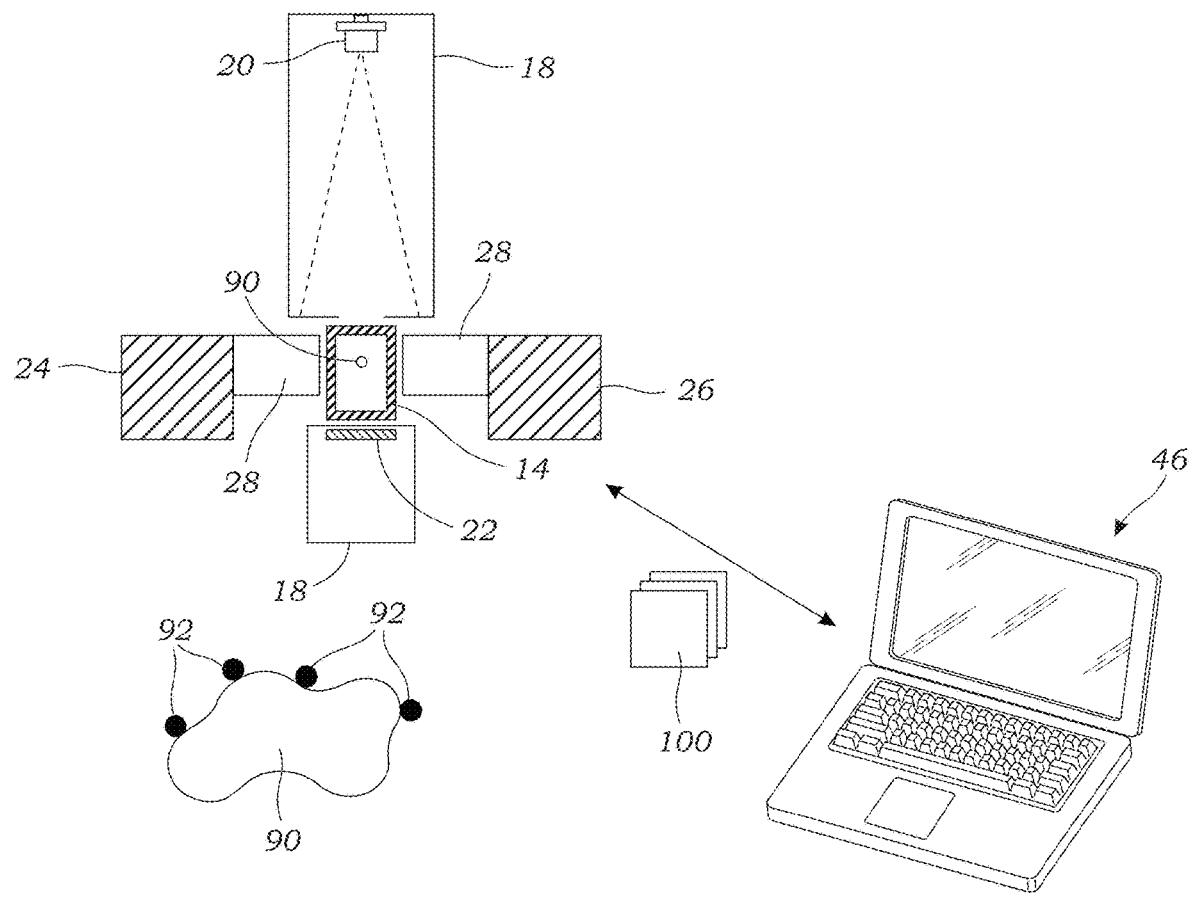
FIG. 1C schematically illustrates a lensless imaging module that is used to generate images or movies that are processed by the computing device via image processing software (FIG. 1B). Also illustrated is an object of interest (e.g., cell) that is conjugated to a plurality of magnetic particles (e.g., beads).

FIGS. 1A-1C illustrate a cytometer device 10 according to one embodiment. The cytometer device 10 is located in a housing or enclosure 12 and contains the various components of the cytometer device 10. The cytometer device 10 itself contains one or more optically transparent sample holder(s) 14 that holds a volume of sample that is to be scanned or interrogated. The optically transparent sample holder 14 may include a capillary, tube, flow cell, or microfluidic channel, for example. The optically transparent sample holder 14 is loaded with a sample obtained from a biological fluid. The optically transparent sample holder 14 may also contain a viscous fluid (e.g., methyl cellulose solution) along with the sample. The sample may include cells, bacteria, protozoa, multi-cellular organisms and the like. The sample may be a biological sample or an environmental sample. In one preferred embodiment, the sample contains cells and is used to identify certain types of cells as explained herein.

As noted above, in some embodiments, there are multiple optically transparent samples holders 14 containing in the cytometer device 10 which permits parallel processing of multiple samples (or larger volumes of the same sample). The cytometer device 10 includes at least one moveable scanning head 16 that disposed adjacent to the optically transparent sample holder 14. FIG. 1A illustrates an embodiment of the cytometer device 10 that contains multiple moveable scanning heads 16. This embodiment allows parallel processing of larger sample sizes or even different samples at the same time. While three such scanning heads 16 are illustrated (along with corresponding sample holders 14) there may be fewer or more scanning heads 16. For example, there may be 1, 2, 3, 4, 5, 6, 7, 8, 9, 10 or more scanning heads 16.

In some cases, the optically transparent sample holder 14 may pass through all or a portion of the scanning head(s) 16. The moveable scanning head(s) 16 includes several components. First, the scanning head 16 includes a lensless imaging module 18 that is used to illuminate the sample within the sample holder 14 with light and obtain a plurality of diffraction pattern images or a movie 100 over a period of time of objects 90 (FIGS. 1C, 4I, 6) contained in the sample in the sample holder 14. The objects 90 may include beads or cells. Each scanning head 16 is associate with its own sample holder 14.

Certain objects 90 are target objects that are desired to be identified or classified. These target objects 90 are to be distinguished from non-target objects 90. In one example, the target objects 90 comprise cells of a particular type or phenotype, morphology, shape, size, or genotype. For example, the target objects 90 may comprise cancer cells or certain type of cancer cells such as circulating tumor cells (CTCs). The target objects 90 are conjugated to one or more magnetic particles 92. Particles 92 may include magnetic beads or the like. The one or more magnetic particles 92 may be made from superparamagnetic particles. An example of such particles 92 include Dynabeads® (Invitrogen, Carlsbad, California, USA). The presence of the conjugated or bound magnetic particle(s) 92 in response to the externally applied magnetic field is what allows for the identification/classification of the target objects 90 as explained herein.

The lensless imaging module 18 includes one or more illumination sources 20 configured to illuminate the sample from a first side of the sample holder 14 and an image sensor 22 (e.g., CMOS sensor) disposed on a second side of the sample holder 14. In one configuration, the one or more illumination sources 20 include a laser diode although light emitting diodes (LEDs) may also be used. The one or more illumination sources 20 may be driven by on-board driver circuitry (not shown) located in the scanning head 16, for example. As described herein, the one or more illumination sources 20 include a laser diode (650-nm wavelength, AML-N056-650001-01, Arima Lasers Corp., Taoyuan, Taiwan) for illumination, which has an output power of ~1 mW. In one configuration, the one or more illumination sources 20 emit light onto the top of the sample holder 14 while the image sensor 22 captures time series of speckle pattern images 100 from the bottom of the sample holder 14.

The image sensor 22 is configured to capture a time series of speckle pattern images 100 created by the one or more objects 90 within the volume of sample. The moveable scanning head(s) 16 further include, in one embodiment, first and second electromagnets 24, 26 located laterally adjacent to the lensless imaging module 18. That is to say, first and second electromagnets 24, 26 are located on either side of the lensless imaging module 18. In some embodiments, optional permalloy (nickel-iron magnetic alloy) rods 28 are used with each of the electromagnets 24, 26 to enhance or relay the magnetic force on the objects 90. In other embodiments, more than two electromagnets 24, 26 may be used with the moveable scanning head(s) 16. The plurality of electromagnets 24, 26 are driven using dedicated circuitry and/or a function generator 30 (FIG. 1B). As an alternative to the function generator 30 an oscillator circuit built form a timer integrated circuit may be used. In one embodiment, the plurality of electromagnets 24, 26 are driven with alternating current with a 180° phase shift. Thus, while one electromagnet (e.g., electromagnet 24) is energized at an on or high state, the other electromagnetic (e.g., electromagnet 26) is energized at on off or low state. This is seen, for example, in the inset of FIG. 1A). This provides an alternating pulling force on the target objects 90 that are bound to the magnetic particle(s) 92. The frequency at which the plurality of electromagnets 24, 26 are driven at may vary between about 0.01 Hz and about 100 kHz, although the platform was optimized for cancer cells at around 1 Hz. Different object 90 and sample conditions (e.g., number of magnetic particles 92, size of objects 90, fluid in which the object is contained, frictional or viscous forces, etc.) affect the frequency required to generate effective oscillations of the objects 90.

The cytometer device 10 further includes a translation stage 32 mechanically coupled to the moveable scanning head(s) 16 and configured to move the moveable scanning head(s) 16 along different regions of the optically transparent sample holder 14. For example, the translation stage 32 may be a linear translation stage 32 that moves the scanning head(s) 16 to different regions on the sample holder 14. In the embodiment illustrated in FIGS. 1A, 1B, the translation stage 32 is mounted on rails 34 on either side of the enclosure or housing 12. The translation stage 32 is thus allowed to move or slide on the rails 34 in the forward and backwards direction of arrow A. The translation stage 32, in one embodiment, is moved via a belt 36 that is driven by a stepper motor 38. The belt 36 is secured to the translation stage 32 and passes over pulleys 40 (front and back with only front illustrated) that is mounted on a support rod 42. The stepper motor 38 moves in one direction to advance the translation stage 32 while the stepper motor 38 moves in the opposing direction to retract the translation stage 32. While the stepper motor 38 and belt 36 is described, other drive mechanisms known to those skilled in the art may be used to move the translation stage 32. The key is that the translation stage 32 can move back-and-forth to move the scanning head(s) relative the sample holder 14. Note that the fluid containing the objects 90 within the sample holder 14 is substantially stationary during the scanning process. There may be slight movements or currents of fluid caused by heating or other effects as described herein which can be addressed using a drift correction procedure as explained herein.

The stepper motor 38 is operated by a driver/drive circuitry (not shown) that is controlled via a microcontroller 44. The microcontroller 44 interfaces with a computing 46 that is used to control the operation of the cytometer device 10 as well as process the images/videos 100 that are acquired by the image sensor 22. The computing device 46 may include a laptop as illustrated but it may also include, for example, a personal computer, tablet PC, mobile phone, or remote computer such as a server or the like. In some embodiments, various tasks or operations may be divided between multiple computing devices 46. For example, one computing device 46 may be used to control the cytometer device 10 and acquire the images/videos 100. Another computing device 46 may run the trained neural network 112 and results may be returned to the controlling computer device 46 (or another computing device 46 entirely). Of course, these tasks may be consolidated into a single computing device 46. The computing device 46 includes image processing software 110 that is executed thereon or thereby that it used to process the images/videos obtained from the image sensor 22. The computing device 46 may also be integrated into the cytometer device 10 in some embodiments.

Some computations or image processing may also take place within the microcontroller 44.

With reference to FIG. 1B, the image processing software 110 processes the raw images 100 (i.e., image frames) that are acquired by the image sensor 22. For example, as described herein, the image processing software 110 may first apply computation drift correction to mitigate for fluid shift within the sample holder 14. Heat from the image sensor 22 may cause localized movement of fluid within the sample holder 14 that causes the objects 90 contained therein to drift. This unwanted drift is corrected by the image processing software 110 that corrects the overall drift of the objects 90 between image frames. The image processing software 110 uses a phase correlation method to estimate the relative translation between each frame in the holographic image sequence and uses 2D bilinear interpolation to remove the drift between frames. Details of the phase correlation method may be found in Reddy, B. S. et al., An FFT-based technique for translation, rotation, and scale-invariant image registration. *IEEE Transactions on Image Processing* 5, 1266-1271 (1996), which is incorporated herein by reference.

The image processing software 110 then uses a high-pass filtered back-propagation step that calculates holographic images at different axial distances within the three-dimensional sample (see FIGS. 4A-4C) using a high-pass-filtered angular spectrum propagation kernel as described herein (e.g., Eq. (1) herein). Computer motion analysis (CMA) is then performed by the image processing software 110 to analyze the differences among the frames to enhance the three-dimensional contrast for periodically moving objects 90 that oscillate at the driving frequency (e.g., Eq. (2) herein). This essentially finds what oscillates while minimizing or ignoring non-oscillating objects 90. This is then followed by a maximum intensity projection (converting 3D to 2D) and threshold-based detection to locate potential candidate objects 90. An autofocusing operation is applied to each candidate object 90 in order to create an in-focus amplitude and phase video of each candidate object 90 (obtained from reconstructions). The candidate objects 90 are then then classified (e.g., as positive, true, yes/negative, false, no) by the trained neural network 112 which is implemented as a densely connected pseudo-3D convolutional neural network (P3D CNN). These classification results are used to generate the final detection/classification decisions and concentration measurements.

Experimental

Characterization of the Oscillation of Bead-Cell Conjugates Under Alternating Magnetic Force The detection technique capitalizes on the periodic oscillatory motion of the target objects 90 of interest (i.e., cells), with a large number of labeling magnetic particles 92, to specifically detect them with high throughput. A pair of electromagnets 24, 26 were used to exert periodic and alternating magnetic force on the magnetic particles 92 bound to these cells of interest 90 (FIGS. 1A-1C). To exert sufficient magnetic force on each labeled cell 90, rods 28 were designed and machined that were made with magnetically soft permalloy, which were attached to the electromagnets 24, 26 to enhance the magnetic force at the sample location by ~40-fold with minimal magnetic hysteresis (see FIG. 7B).

Figure 2:
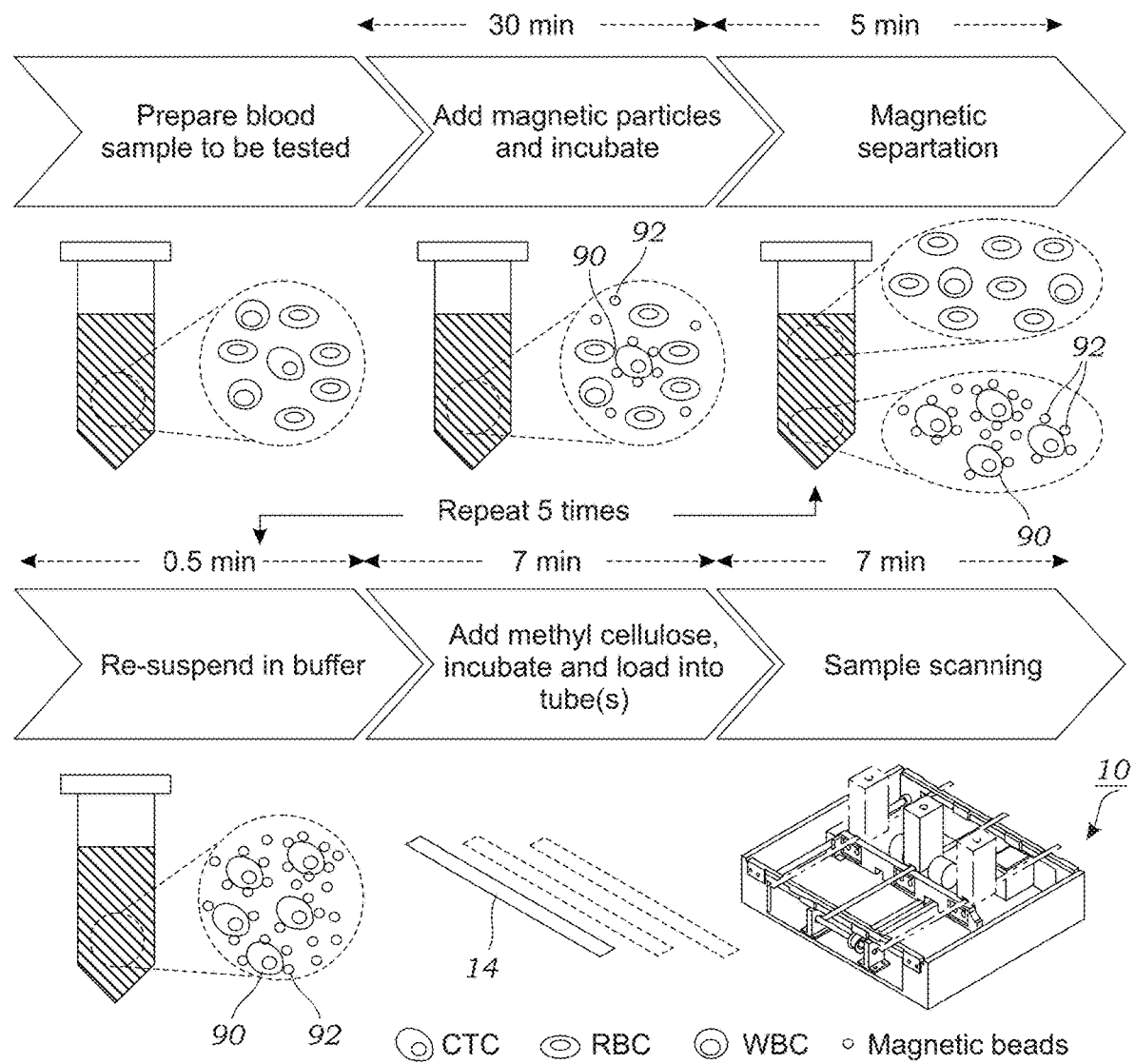
FIG. 2 illustrates sample preparation and imaging procedures according to one embodiment. The sample preparation time before scanning is approximately 1 hour, where the first 30 min is passive incubation that does not require supervision.

The movement of MCF7 cells 90 conjugated with Dynabeads® 92 was recorded by mounting the magnetic actuator and the labeled cells onto a 40×0.6NA benchtop microscope (see FIG. 3). This was done to verify movement of the cells 90 but is not used as part of the cytometer device 10 (i.e., done for experimental verification). The sample preparation procedure is depicted in FIG. 2, where the Dynabead®-conjugated cells 90 were suspended in a methyl cellulose solution (a viscous fluid) and were subjected to alternating magnetic fields with a period of 1 s and a square-wave driving current. As shown in FIGS. 3A-3O, due to the high viscosity of the methyl cellulose solution, the labelled cells 90 mainly demonstrated 3D rotational motion. Typically, the motion of a labeled cell 90 starts at the beginning of a cycle of the magnetic field (e.g., t=0.5 s), approaching a steady state (e.g., t=1.0 s) before the magnetic field switches its direction and the cell rotates in the reverse direction (e.g., between t=1.0 s and t=1.5 s). The two extreme positions of the rotational motion are demonstrated in FIG. 3P by overlaying the images captured at t=0.5 s and t=1.0 s using magenta and green colors, respectively.

Various unbound magnetic beads 92 and clusters of beads 92 are also observed within the sample (FIG. 3P reports some examples, marked with text and arrows), which also oscillate at the same frequency as that of the bead-conjugated target cells 90. If not handled properly, these might form a major cause of false positives. However, the spatio-temporal dynamics of bead-conjugated cells 90 significantly differ from those of unbound beads 92 and clusters of beads 92. For a given amount of magnetic driving force, the bead-conjugated cells 90 are subjected to more inertia and viscous drag, which is manifested by a slower response to the magnetic field, i.e., a slower rotational motion. In addition, magnetic beads 92 typically form chains when they cluster under an external magnetic field, and these chains exhibit a swinging motion under the alternating magnetic field. This contrasts with the 3D rotational motion, i.e., the "rolling" motion associated with the bead-conjugated cells 90. These intricate spatio-temporal dynamic features, in addition to morphological differences, are utilized by a subsequent classification step (based on the deep neural network 112) to achieve higher accuracy and eliminate false positive detections.

Cell Detection and Classification Using CMA and Deep Learning

The sample, which contains the periodically oscillating target cells 90 and other types of unwanted background particles or objects 90, is illuminated with coherent light. The interference pattern recorded by the CMOS image sensor 22 represents an in-line hologram of the target cells 90, which is partially obscured by the random speckle noise resulting from the background particles, including other unlabelled cells, cell debris and unbound magnetic particles 92. Recorded at 26.7 frames per second using the CMOS image sensor 22, these patterns exhibit spatio-temporal variations that are partially due to the controlled cell motion. This phenomenon is exploited for the rapid detection of magnetic-bead-conjugated rare cells 90 from a highly complex and noisy background. FIGS. 4A-4G show the detailed computational steps for the preliminary screening of cell candidates from a raw holographic image sequence. First, a computational drift correction step mitigates the overall drift of the sample between frames. Then, a high-pass filtered back-propagation step using the angular spectrum method calculates the holographic images at different axial distances within the 3D sample. A CMA step analyses the differences among the frames to enhance the 3D contrast for periodically moving objects 90 that oscillate at the driving frequency and employs time averaging to suppress the random speckle noise caused by background particles. This is then followed by a maximum intensity projection and threshold-based detection to locate potential cell candidates 90.

The cell candidates 90 that are detected in this preliminary screening step contain a large number of false positives, which mainly result from unbound magnetic beads 92 that form clusters under the external magnetic field. Therefore, another classification step was used (FIG. 4H-4K) to improve the specificity of the final detection. For this classification step, a densely connected P3D CNN structure was used for the trained neural network 112 to classify the holographic videos to exploit the spatial and temporal information encoded in the captured image sequence. The densely connected P3D CNN structure is modified based on a recently proposed CNN structure by Qu et al. by adding dense connections. See e.g., Qiu et al., Learning spatio-temporal representation with pseudo-3d residual networks. Proceedings of 2017 IEEE International Conference on Computer Vision. Venice, Italy: IEEE, 2017, 5533-5541, which is incorporated herein by reference. Compared to other machine learning techniques, the use of a deep neural network for video classification is typically more powerful, and the network can be retrained to classify other types of cells or objects of interest.

An autofocusing step is applied to each candidate object 90 to create an in-focus amplitude and phase video, which is then classified (as positive/negative) by a densely connected P3D CNN 112. These classification results are used to generate the final rare cell detection decisions and cell concentration measurements. The CNN was trained and validated with manually labelled video clips generated from ten samples that were used solely for creating the training/validation datasets. This training needs to be performed only once for a given type of cell-bead conjugate.

Evaluation of System Performance

To quantify the LoD of the platform 10 for detecting MCF7 cells 90 in human blood, cultured MCF7 cells 90 were spiked in whole blood at various concentrations and used the technique to detect the spiked MCF7 cells. Using spiked samples instead of clinical samples provides a well-defined system to characterize and quantify the capabilities of the platform, which is an important step before moving to clinical samples in the future. In each experiment, 4 mL of MCF7-spiked whole human blood at the desired concentration was prepared. Then, the procedure in FIG. 2 was followed to perform magnetic separation and embed the recovered cells 90 in the viscous methyl cellulose medium, resulting in ~3.2 mL of final sample volume. This prepared sample was then loaded into the sample holder 14 (i.e., disposable capillary tube) to be screened by the computational cytometer 10. Because the capillary tube length is designed to be longer than the range of the motion of the translation stage 32 and because the capillary tube 14 was wider than the width of the CMOS sensor 22, the actual imaged volume per test (within the sample tube) is ~0.942 mL, which corresponds to ~1.177 mL of the blood sample before the enrichment process.

Figure 5:
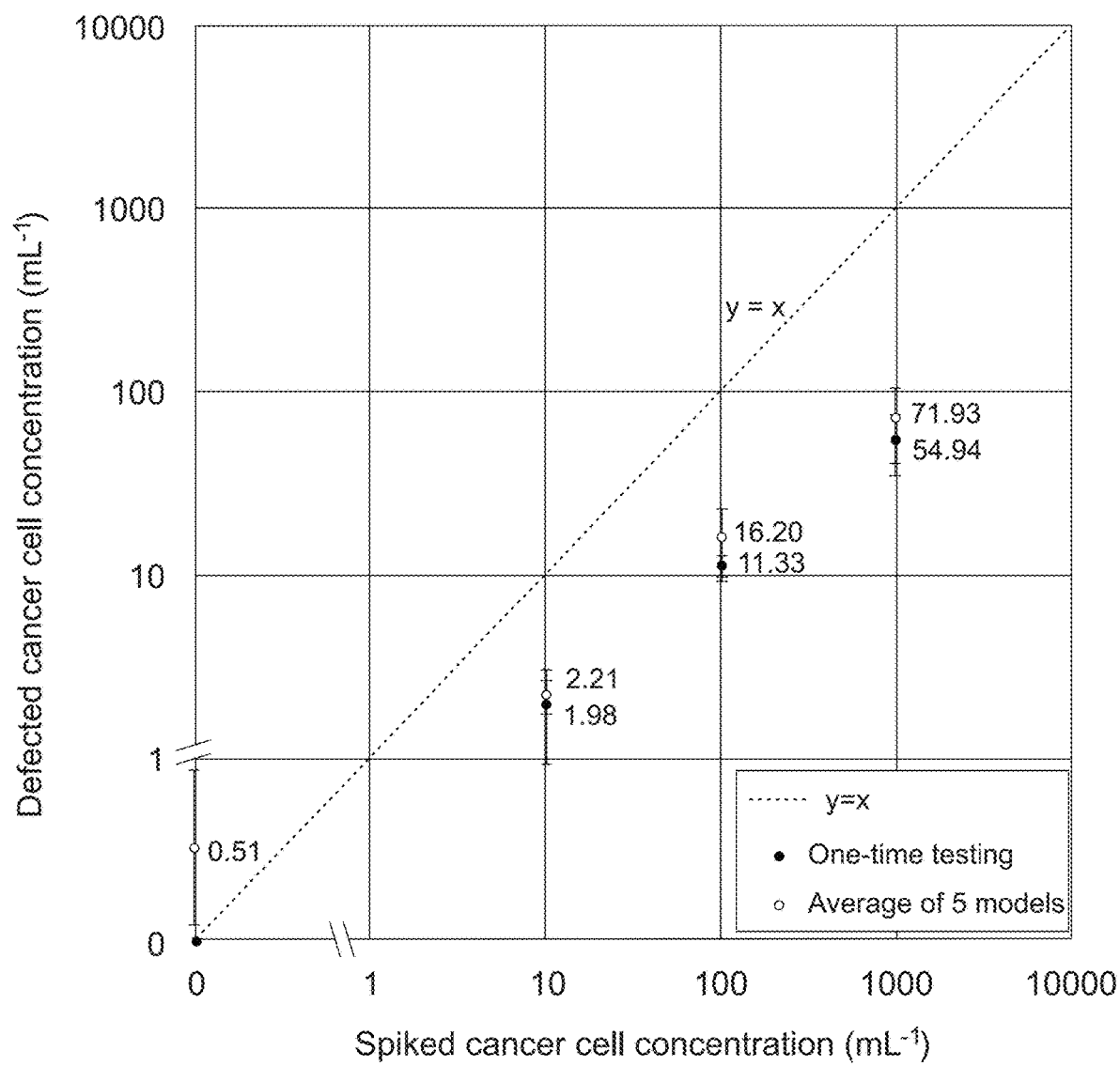
FIG. 5 illustrates the quantification of the limit of detection (LoD) of the computational cytometer based on magnetically modulated lensless speckle imaging for the detection of MCF7 cells in whole blood. The axes are a hybrid of logarithmic and linear scales to permit 0 cells/mL to be shown in the same plot. The solid data points represent one-time testing results of a single trained P3D CNN. The error bars represent the respective standard deviation of the three repeated tests at each spiked target cell concentration. The circle data points represent the averaged testing results using five P3D CNNs that were individually trained on a different subset of data. The error bars represent the standard deviation resulting from the detections of the five individual networks; for each trained network, three detected concentrations are averaged at each spiked concentration.

MCF7 concentrations of 0 $mL^{-1}$ (negative control), 10 $mL^{-1}$, 100 $mL^{-1}$ and 1000 $mL^{-1}$ were tested, where three samples for each concentration were prepared and independently measured. FIG. 5 shows the results of the blind testing of the technique using serial dilution experiments. The data points correspond to a one-time testing result, where the error bars correspond to the standard deviations of the three detected concentrations at each spiked concentration. Without the detection of any false positives in the negative control samples, the technique was able to consistently detect MCF7 cells 90 from 10 $mL^{-1}$ samples, measuring a target cell concentration of 1.98±1.06 $mL^{-1}$. At this low concentration (10 cells/mL), the detection rate was approximately 20%. The experimentally measured detection rate dropped to ~5% at a higher concentration of 1000 cells/mL.

Because the training of the deep neural network 112 inherently includes randomness, the repeatability of the network training process was further evaluated. For this, the training data was randomly and equally divided into five subsets, and five individual networks 112 were trained by assigning one different subset as the validation dataset and the combination of the remaining four subsets as the training dataset. Each of the five networks was blindly tested to generate the serial dilution results. The mean and standard deviation of the detected concentrations resulting from the five networks are shown in FIG. 5. Overall, good consistency between the different network results is observed.

The under detection of the system is due to a combination of both systematic errors and random factors. A major reason for under detection is the tuning of the classification network 112. In the preliminary screening step, because there are typically a large number of false positive detections and a low number of true positive detections (since the target cells are quite rare), the classifier must be tuned to have an extremely low false positive rate (FPR) to have a low LoD. To satisfy this, a widely adopted method for tuning the classifier was adopted where a decision threshold was selected based on the training/validation dataset, which leads to a zero FPR. However, an inevitable side effect of reducing the FPR is a reduction in the true positive rate (TPR). Based on the validation results, when a decision threshold of 0.999999 was used, the TPR dropped to 10.5%. This explains a major portion of the reduced detection rate that was observed in the serial dilution tests (FIG. 5). Another systematic error that contributes to the under detection is the imperfect recovery rate of MCF7 cells during the enrichment. The recovery rate of MCF7 cells using Dynabeads® was experimentally determined to be ~85% as seen in Table 1.

TABLE 1

| | Concentration ($mL^{-1}$) | |
| --- | --- | --- |
| | Before enrichment | After enrichment |
| Total labeled MCF7 cells | $1.1 \times 10^5$ | $9.4 \times 10^4$ |
| Non-clustering labeled MCF7 cells | — | $4.7 \times 10^4$ |
| Labeled MCF7 cell clusters | — | $1.7 \times 10^4$ |
| Blood cells | ~$5 \times 10^9$ (estimated based on the average healthy human blood cell concentration) | $1.6 \times 10^6$ |
| Magnetic beads | — | $1.3 \times 10^6$ |
| Bead clusters | — | $1.1 \times 10^5$ |

Table 1 shows the concentrations of different types of cells and particles in the sample before and after the magnetic enrichment. MCF7 cells were spiked into a whole blood sample at a concentration of $1.1 \times 10^5$ $mL^{-1}$, and enrichment was performed following the procedure reported in FIG. 2. After the enrichment, the sample was loaded into a counting chamber and imaged by a 20×0.45NA benchtop microscope, and the particles/cells were manually counted. In order to directly compare it with the concentration before the enrichment step, the concentration after the enrichment is normalized by a volume factor (i.e., the ratio between the volume before the enrichment and the volume after the enrichment). As reported in Table 1, there is over three orders of magnitude decrease in the concentration of blood cells, while the recovery rate for the target MCF7 cells is ~85%. The concentrations of unbound beads and bead clusters reported here only provide an estimate, because bead clusters are also dynamically formed during the experiments, when there is an external magnetic field applied.

The remainder of the under detection and fluctuations in the detection rate at different concentrations may be associated with various other factors, e.g., sample handling errors (especially at low cell concentrations), clustering of the target cells, and non-uniform labelling of cells 90 with magnetic beads 92. In fact, MCF7 cells are known to form clusters and have thus been extensively used for preparing in vitro tumour models. In an experiment where MCF7 cells were spiked at a concentration of $1.1 \times 10^5$/mL (Table 1), it was observed that ~50% of the MCF7 cells formed clusters after enrichment. However, the amount of clustering is expected to be lower at decreased MCF7 concentrations, which partially explains the reduced detection efficiency at higher cell concentrations. This clustering of cells not only reduces the overall number of target entities but may also exhibit changes in their oscillation patterns and may be misclassified by the classifier.

Discussion

The computational cytometry technique may be applied for the detection of various types of rare cells 90 in blood or other bodily fluids using appropriately selected ligand-coated magnetic beads 92. There are several advantages of the magnetically modulated speckle imaging technique. The first important advantage is its ability to detect target rare cells 90 without any additional modification such as labeling with fluorescent or radioactive compounds. The same magnetic beads 92 that are used for capturing and isolation of target cells 90 from whole blood are also used for the purpose of periodic cell modulation and specific detection within a dense background. False positives are mitigated by identifying the controlled spatio-temporal patterns associated with the labeled target cells 90 through a trained deep neural network 112.

Compared to existing approaches, the technique also has the advantages of a relatively low LoD, rapid detection and low cost, which makes it suitable for sensitive detection of rare cells 90 in resource-limited settings. For example, fluorescence imaging and Raman microscopy have been widely used to detect rare cells and have been shown to have very low LoDs (e.g., ~1 cell/mL), but they are typically limited by a high system cost and complexity.

The entire prototype of the computational cytometer 10 shown in FIGS. 1A, 1B (excluding the function generator 30, power supply (not shown) and laptop computer 46) has a raw material cost of ~$750. This cost can be significantly reduced under large volume manufacturing, and currently it is mainly attributed to the image sensor 22 and framegrabber (~$550), the permalloy rod 28 (~$70), and the electromagnets 24, 26 (~$40), with the other components being much more inexpensive. In other embodiments, the power supply and function generator 30 can be replaced with cost-effective integrated circuit chips. For example, the power supply can be replaced with a 20 V power adapter (e.g., TR9KZ900T00-IMR6B, GlobTek, Inc., Northvale, NJ, USA) and a step-down converter (e.g., LTC3630EMSE#PBF, Analog Devices, Norwood, MA, USA) to supply 20 V and 12 V for the electromagnets 24, 26 and the stepper motor 38, respectively; the function generator 30 can be replaced with an oscillator circuit built from a timer integrated circuit (e.g., NE555DR, Texas Instruments, Dallas, TX, USA). The total cost of these components would be less than $25. Furthermore, the device 10 can be easily scaled up to include two or more parallel imaging channels to achieve a higher sample throughput, which is proportionate with the number of imaging channels.

Methods

Cell Preparation

MCF7 cell lines were purchased from ATCC (Manassas, Virginia, USA). Cells were plated with 10 mL of growth media in T75 flask (Corning Inc., New York, USA) at a concentration of $1 \times 10^5$ cells/mL. The growth media was composed of Dulbecco's Modified Eagle Medium (DMEM, Gibco®, Life Technologies, Carlsbad, California, USA) supplemented with 10% (v/v) fetal bovine serum (FBS, Gibco®, Life Technologies, Carlsbad, California, USA) and 1% penicillin-streptomycin (Sigma-Aldrich Co., St. Louis, Missouri, USA). Cells 90 were grown in a humidified incubator at 37° C. in a 5% $CO_2$ environment. Cells were harvested by treating them with 0.25% trypsin-edta (Gibco®, Life Technologies, Carlsbad, California, USA) for 3 min 2-3 days after seeding depending on confluency. Then, cells 90 were pelleted by centrifuging for 3 min at 1200 RPM and resuspended in the growth media to a final concentration of $1 \times 10^6$ cells/mL.

Sample Preparation

Rare cell dilution: The MCF7 cells 90 were serially diluted in Dulbecco's phosphate-buffered saline (DPBS, Sigma-Aldrich Co., St. Louis, Missouri, USA) at different concentrations ($2 \times 10^4$ cells/mL, $2 \times 10^3$ cells/mL, and $2 \times 10^2$ cells/mL). The dilution of MCF7 cells 90 in whole blood was prepared by mixing the cell solution with whole blood at a ratio of 1:19 (v/v). Most of the experiments were performed by mixing 200 µl of cell solution with 3.8 mL of whole blood. Healthy human whole blood (from anonymous and existing samples) was obtained from the UCLA Blood and Platelet Center.

Bead washing: CELLection Epithelial Enrich Dynabeads® 92 (Invitrogen, Carlsbad, California, USA) were first resuspended in DPBS and vortexed for 30 sec. A magnet (DX08B-N52, K&J Magnetics, Inc., Pipersville, Pennsylvania, USA) was then used to separate the Dynabeads® 92 and the supernatant was discarded. This process was repeated three times, and the Dynabeads® 92 were resuspended in DPBS at the initial volume.

Rare cell separation: The washed Dynabeads® 92 were then added to the MCF7-spiked whole blood sample at a concentration of 2.5 µL beads per 1.0 mL of blood sample. The mixture was incubated for 30 min with gentle tilting and rotation. A magnet was placed under the vial for 5 min and the supernatant was discarded after that. To this solution, 1 mL of cold DPBS buffer was added and mixed gently by tilting from side to side. This magnetic separation procedure was repeated five times. After the final step, the sample was resuspended in 0.7 mL of DPBS and gently mixed with 2.5 mL of 400 cP methyl cellulose solution (Sigma-Aldrich Co., St. Louis, Missouri, USA) using a pipette. The sample was incubated for 5 min to reduce the number of bubbles before it was loaded into a glass capillary tube 14 (Part #BRT 2-4-50; cross-section inner dimension of 2 mm×4 mm; Friedrich & Dimmock, Inc., Millville, New Jersey, USA). The ends of the capillary tube 14 were sealed with parafilm before the tube 14 was mounted onto the computational cytometer 10 for imaging and cell screening.

Design of the Computational Cytometer Based on Magnetically Modulated Lensless Speckle Imaging As shown in FIGS. 1A-1C, the device hardware consists of a scanning head 16 with a lensless imaging module 18, electromagnets 24, 26 and a translation stage 32. The lensless imaging module 18 in FIGS. 1A-1C, contains a laser diode 20 (650-nm wavelength, AML-N056-650001-01, Arima Lasers Corp., Taoyuan, Taiwan) for illumination, which has an output power of ~1 mW. The sample is loaded inside a capillary tube 14 with a rectangular cross section, which is placed ~7.6 cm below the light source 14. A CMOS image sensor 22 (acA3800-14 um, Basler, Ahrensburg, Germany) with a pixel size of 1.67 µm, which is placed below the glass tube 4 with a narrow gap (~1 mm), is used to capture the holographic speckle/diffraction patterns generated by the liquid sample. To induce oscillatory motion to the labeled cells in the sample, two electromagnets 24, 26 (Part #XRN-XP30×22, Xuan Rui Ning Co., Ltd., Leqing, Zhejiang Province, China) with custom-machined permalloy rods 28 are placed on either side of the glass tube 14. An alternating driving current (square wave) from the function generator 30 is supplied to either of the electromagnets 24, 26, with a 180° phase shift between them, which creates alternative pulling force to the magnetic particles 92 within the sample. The low level of the driving current is 0, and the high level of the driving current is ~500 mA. The frequency is 1 Hz, which was experimentally optimized to maximize the signal corresponding to the magnetic bead-conjugated cancer cells 90.

The translation stage 32 (i.e., linear translation stage) is custom-built using off-the-shelf components. A bipolar stepper motor 38 (No. 324, Adafruit Industries LLC., New York, USA) with two timing pulleys 40 and a timing belt 36 is used to provide mechanical actuation, and the lensless imaging module 18 is guided by a pair of linear motion sliders and linear motion shafts 34 on either side of the scanning head. 3D-printed plastic is used to construct the housing for the scanning head 16, and laser-cut acrylic is used to create the outer shell or enclosure 12 of the device 10.

Image Acquisition

After the sample is loaded into the capillary tube 14 and placed onto the computational cytometer 10, the image acquisition procedure begins. The translation stage 32 moves the scanning head 16 to a series of discrete positions along the glass tube 14. At each position, the stage stops 32, allowing the CMOS image sensor 22 to capture a sequence of 120 holograms at a frame rate of 26.7 fps before moving onto the next position. The image data are saved to a solid-state drive (SSD) (which may be disposed in the computing device 46) for storage and further processing.

Because the FOV corresponding to the edges (i.e., top and bottom rows) of the image sensor 22 is subject to highly unbalanced magnetic force field due to the closeness to one of the electromagnets 24, 26, only the central 1374 rows of the image sensor's 22 pixels are used to capture the image sequence, where the magnetic force from the two electromagnets 24. 26 are relatively balanced.

Because the temperature of the CMOS image sensor 22 quickly rises when it is turned on, it tends to cause undesired flow inside the glass tube 14 due to convection. Therefore, a scanning pattern is engineered to reduce the local heating of the sample: if one denotes 1, 2, . . . , 32 as the indices of the spatially adjacent scanning positions, the scanning pattern follows 1, 9, 17, 25, 2, 10, 18, 26, . . . . This scanning pattern ensures that a given part of the sample cools down before the scanning head 16 moves back to its neighborhood. The power to the image sensor 22 was also cut off during the transition between the two successive scanning positions, which was implemented by inserting a MOSFET-based switch into the power line of the USB cable.

Computational Detection and Localization of Cell Candidates and Deep Learning-Based Classification The image processing procedure (FIGS. 4A-4K) can be divided into two parts: (1) a preliminary screening step, which applies computational drift correction and MCF7 candidate detection to the entire FOV to locate target cell 90 candidates in 2D, and (2) a classification step, which refocuses the holographic image sequence to each individual MCF7 candidate 90 in its local area, generates an in-focus amplitude and phase video for each candidate, and classifies the corresponding video with a trained deep neural network 112. This procedure is further detailed below.

1. Preliminary Screening

Computational Drift Correction

The sample fluid in the glass capillary tube 14 often drifts slowly throughout the duration of the image acquisition, which is due to e.g., the imperfect sealing at the ends of the tube and the convection due to the heat from the image sensor 22. Because the detection and classification of the target cells 90 are largely based on their periodic motion, the drifting problem should be corrected. Since the sample is embedded within a viscous methyl cellulose, minimal turbulent flow is observed, and the drifting motion within the imaged FOV is almost purely translational. A phase correlation method was used to estimate the relative translation between each frame in the sequence with respect to a reference frame (chosen to be the middle frame in the holographic image sequence), and used 2D bilinear interpolation to remove the drift between frames (FIG. 4B and FIG. 4D).

Detection of Target Cell Candidates

The detection of the target cell candidates 90 plays a key role in automatically analyzing the sample, because it greatly narrows down the search space for the rare cells of interest and allows the subsequent deep learning-based classification to be applied to a limited number of holographic videos. In the preliminary screening stage, the lateral locations of the MCF7 candidate cells 90 are detected (FIG. 4C). Each frame of the raw hologram sequence was propagated to various axial distances throughout the sample volume using a high-pass-filtered angular spectrum propagation kernel, which can be written as:

$$B_i(z_j) = HP[\mathcal{F}(A_i, z_j)] \tag{1}$$

where HP(•) denotes the high-pass filter, $\mathcal{F}(•)$ denotes angular spectrum propagation, $A_i$ denotes the i-th frame of the raw hologram sequence after the drift correction, $z_j$ denotes the j-th propagation (axial) distance. The selected propagation distances ranged from 800 µm to 5000 µm with a step size of 100 µm to ensure coverage of all possible MCF7 candidates 90 within the sample tube. A zoomed-in image of $B_i(z_j)$ corresponding to an example region is shown in FIG. 4E.

Next, for every given propagation distance, a CMA algorithm was applied to reveal the oscillatory motion of the target cells 90 within the sample, which focuses on periodic changes in the recorded frames:

$$C(z_j) = \frac{1}{N_F - N} \sum_{i=1}^{N_F-N}\left(\frac{1}{2}\left|B_i(z_j) - B_{i+\frac{N}{2}}(z_j)\right| + \frac{1}{2}\left|B_{i+\frac{N}{2}}(z_j) - B_{i+N}(z_j)\right| - \left|B_i(z_j) - B_{i+N}(z_j)\right|\right) \tag{2}$$

where C(z) and B(z) are shorthand notations for C(x, y; z) and B(x, y; z), respectively, $N_F$ is the total number of recorded frames (in this case, $N_F$=120), and N was chosen such that the time difference between the $i^{th}$ frame and the $(i+N)^{th}$ frame is equal to the period of the alternating magnetic field. Therefore, the first two terms inside the summation in Eq. (2) represent half-period movements at the j-th propagation distance, and the last term represents the whole-period movement. Ideally, for objects 90 that oscillate periodically with the alternating magnetic force field, the first two terms should be relatively large, and the last term should be relatively small. For randomly moving objects 90, the three terms in the summation approximately cancel each other out. As a result, C(x, y; z) is a 3D contrast map that has high values corresponding to the locations of periodic motion that matches the frequency of the external magnetic field. An example of C is shown in FIG. 4F.

To simplify segmentation, a maximum intensity projection along the axial direction (i.e., z) was applied to flatten the 3D image stack into a 2D image, which can be written as:

$$D(x, y) = \max_z [C(x, y; z_1), C(x, y; z_2), \ldots, C(x, y; z_{N_H})] \quad (3)$$

where x and y are the lateral indices, and $N_H$ is the total number of axial positions (in this case, $N_H$=43). An example of D is shown in FIG. 4C, with a zoomed-in image shown in FIG. 4G. Thresholding-based segmentation was applied to the calculated 2D image D, and the resulting centroids are used as the lateral positions of the MCF7 candidates 90.

2. Classification

Autofocusing and Video Generation

After the preliminary screening, which identifies the lateral centroids of potential target cell candidates 90, the subsequent processing is applied to each MCF7 candidate 90 only within their local area. Autofocusing[62,63] was first performed to locate the MCF7 candidate in the axial direction. Because $C(x, y; z_j)$ should have a higher value when approaching the in-focus position of each MCF7 candidate 90, the approximate axial position was obtained by maximizing (as a function of $z_j$) the sum of the pixel values of $C(x,y;z_j)$ (j=1, 2, . . . , $N_H$) in a local neighborhood around each individual MCF7 candidate 90. A local neighborhood size of 40×40 pixels (i.e., 66.8 μm×66.8 μm) was used.

This process can be written as follows:

$$\hat{z}_k = \underset{z_j=1,2,\ldots,N_H}{\operatorname{argmax}} \sum_{x,y=-19}^{20} C(x_k + x, y_k + y; z_j) \quad (4)$$

where $\hat{z}_k$ is the resulting in-focus position for the k-th potential target cell candidate and $x_k$ and $y_k$ are the lateral centroid coordinates of the k-th potential target cell candidate.

Figures 4H, 4I, 4J, 4K:
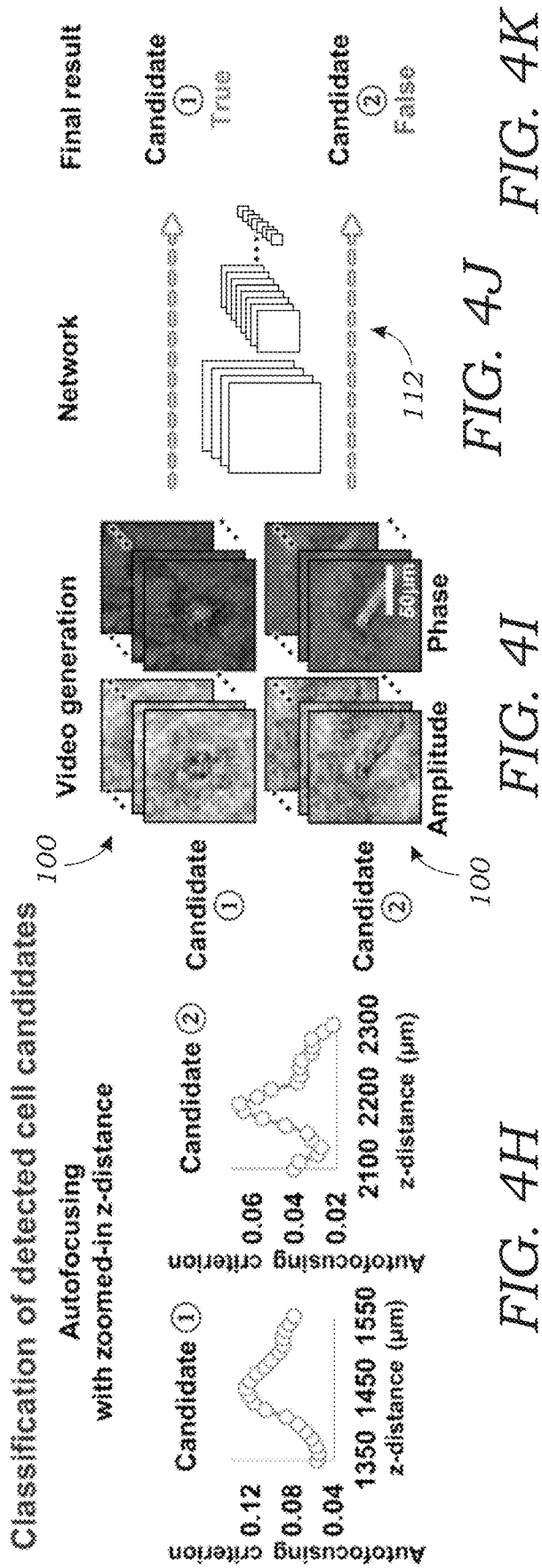

The same criterion to find the focus plane can be applied again with finer axial resolution to obtain a more accurate estimation of the axial distance for each MCF7 candidate 90. A step size of 10 μm was used in this refined autofocusing step. Two examples of this process are shown in FIG. 4H. Alternatively, the Tamura coefficient could also be used as the autofocusing criterion to determine the in-focus plane.

Finally, the in-focus amplitude and phase video corresponding to each MCF7 candidate 90 was generated by digitally propagating every frame of the drift-corrected hologram sequence to the candidate's in-focus plane. The final video has 120 frames at 26.67 fps with both the amplitude and phase channels, and each frame has a size of 64×64 pixels (pixel size=1.67 μm). Two examples corresponding to two cell candidates 90 are shown in FIG. 4I.

Target Cell Detection Using Densely Connected P3D CNN

Each video of the MCF7 candidate 90 was fed into a classification neural network 112 (FIG. 6), which outputs the probability of having an MCF7 cell 90 in the corresponding video (FIGS. 4J-4K). A novel structure for the classification neural network 112 was designed, named densely connected P3D CNN, which is inspired by the Pseudo-3D Residual Network and the Densely Connected Convolutional Network. The original P3D CNN used a mixture of three different designs of the P3D blocks to gain structural diversity, which resulted in a hater performance. Here, a densely connected structure was used in the P3D CNN structure by adding dense (skip) connections inside the spatiotemporal convolution block (dashed black arrows in FIG. 6 inset) to unify the three different P3D blocks. This allowed a simpler network 112 design that was easier to implement for the designed task.

Figure 6:
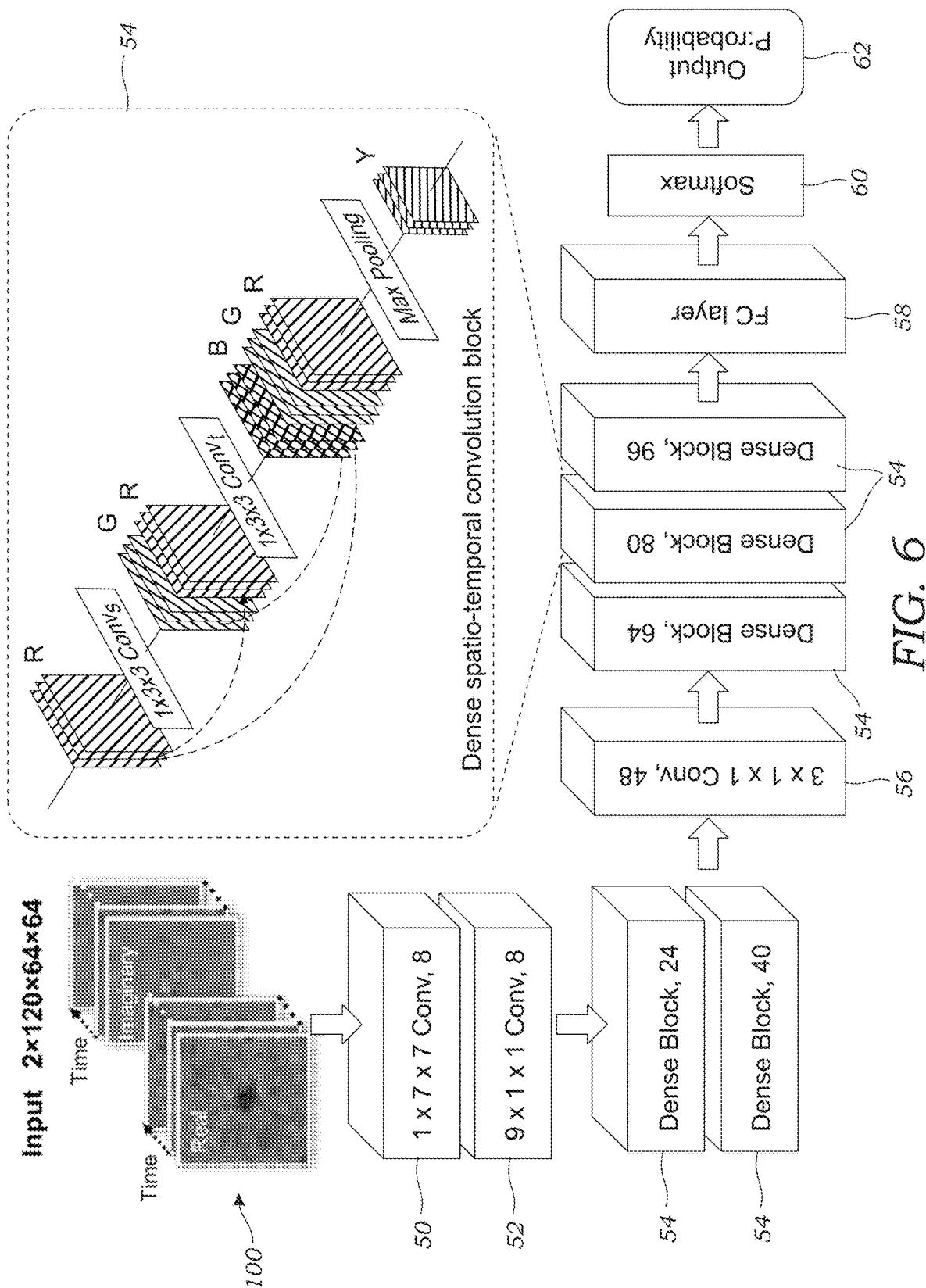
FIG. 6 illustrates the structure of the trained neural network according to one embodiment. In this embodiment, the neural network was a densely connected P3D CNN. Network consists of convolutional layers, series of dense blocks, a fully-connected layer, and a softmax layer. As shown in the inset, each dense spatial-temporal convolution block was constructed by introducing skip connections between input and output of convolutional layers in channel dimension, where red (R) represents the input of the dense block, green (G) and blue (B) represent the output of spatial and temporal convolutional layers, respectively, and yellow (Y) represents the output of the entire block.

The detailed structure of the densely connected P3D CNN 112 is shown in FIG. 6. The network 112 contains five densely connected spatio-temporal convolutional blocks. As shown in the inset of Fig., each block consists of a 1×3×3 spatial convolutional layer ($Conv_s$), a 3×1×1 temporal convolutional layer ($Conv_t$), followed by a max pooling layer (Max). Each spatial (or temporal) convolutional layer is a composition of three consecutive operations: batch normalization, a rectified linear unit (ReLU) and a spatial (or temporal) convolution (with stride=1 and output channel number equal to the growth rate k=8). In each block, skip connections are introduced between the input and output of the $Conv_s$ layer as well as the $Conv_t$ layer by concatenating ($\oplus$) the input and the output in the channel dimensions. For a given input tensor $m_p$, the densely connected spatio-temporal convolutional block maps it to the output tensor if $m_{p+1}$ which is given by:

$$m_{p+1} = \operatorname{Max}[Conv_t(Conv_s(m_p) \oplus m_p) \oplus (Conv_s(m_p) \oplus m_p)] \quad (5)$$

For example, consider an input video with a size of c×t×h×w where c, t, h and w denote the number of channels, number of frames (time), height and width of each frame (space), respectively. Here, c=2, t=120, and h=w=64. First the video passes through a 1×7×7 spatial convolutional layer 50 (stride=2) and a 9×1×1 temporal convolution layer 52 (stride=3) sequentially. The output channel numbers of the layers are included in FIG. 6 in each box (right). Then the data go through five (5) dense blocks 54, where between the $2^{nd}$ and $3^{rd}$ dense blocks an additional 3×1×1 (stride=1) convolutional filter 56 was added with no padding to ensure that the time and space dimensions are equal. A fully connected (FC) layer 58 with a 0.5 dropout rate and a softmax layer 60 are introduced, which output the class probability 62 (target rare cell 90 or not) for the corresponding input video. Finally, a decision threshold is applied to the class probability output to generate the final positive/negative classification (FIG. 4K), where the decision threshold is tuned based on the training/validation data to reduce the FPR. The threshold may be based on cut-off of the class probability (e.g., if class probability is greater than 0.8 or 80% then this corresponds to true, otherwise false).

Network Training and Validation

Ten experiments (i.e., ten samples) were performed to create the training/validation datasets for the classifier 112 and then used the trained classifier to perform blind testing on additional serial dilution experimental data (FIG. 5), which had no overlap with the training/validation data. Among the ten experiments for constructing the training/validation dataset, 5 were negative controls, and the other 5 were spiked whole blood samples at an MCF7 concentration of $10^3$ mL$^{-1}$. When manually labelling the video clips to create the training/validation dataset, it was noticed that some videos were difficult to label, where the annotators could not make a confident distinction. Therefore, to ensure an optimal labelling accuracy, the negative training data came from only the 5 negative control experiments, where all the candidate videos from those experiments were used to construct the negative dataset. The positive training data were manually labelled by two human annotators using 5 experiments spiked at $10^3$ mL$^{-1}$, where only the video clips that were labelled as positive with high confidence by both annotators were selected to enter the positive training dataset, while all the others were discarded.

Next, the training/validation datasets were randomly partitioned into a training set and a validation set with no overlap between the two. The training set contained 1713 positive videos and 11324 negative videos. The validation set contained 788 positive videos and 3622 negative videos. The training dataset was further augmented by randomly mirroring and rotating the frames by 90°, 180° and 270°. The convolutional layer weights were initialized using a truncated normal distribution, while the weights for the FC layer were initialized to zero. Trainable parameters were optimized using an adaptive moment estimation (Adam) optimizer with a learning rate of $10^{-4}$ and a batch size of 240. The network converged after ~800-1000 epochs. The network structure and hyperparameters were first optimized to achieve high sensitivity and specificity for the validation set. At a default decision threshold of 0.5, a sensitivity and specificity of 78.4% and 99.4%, respectively, were achieved for the validation set; a sensitivity and specificity of 77.3% and 99.5%, respectively, were achieved for the training set. After this initial step, because the rare cell detection application requires the classifier to have a very low FPR, the decision threshold of the classifier was further tuned to avoid false positives. For this, the training and validation datasets were combined to increase the total number of examples, and the decision threshold (for positive classification) was gradually increased from 0.5 while monitoring the FPR for the combined training/validation dataset. It was found that a decision threshold of 0.99999 was able to eliminate all false positive detections in the combined training/validation dataset. The decision threshold was further raised to 0.999999 to account for potential overfitting of the network to the training/validation data and further reduced the risk of false positive detections.

Figure 9:
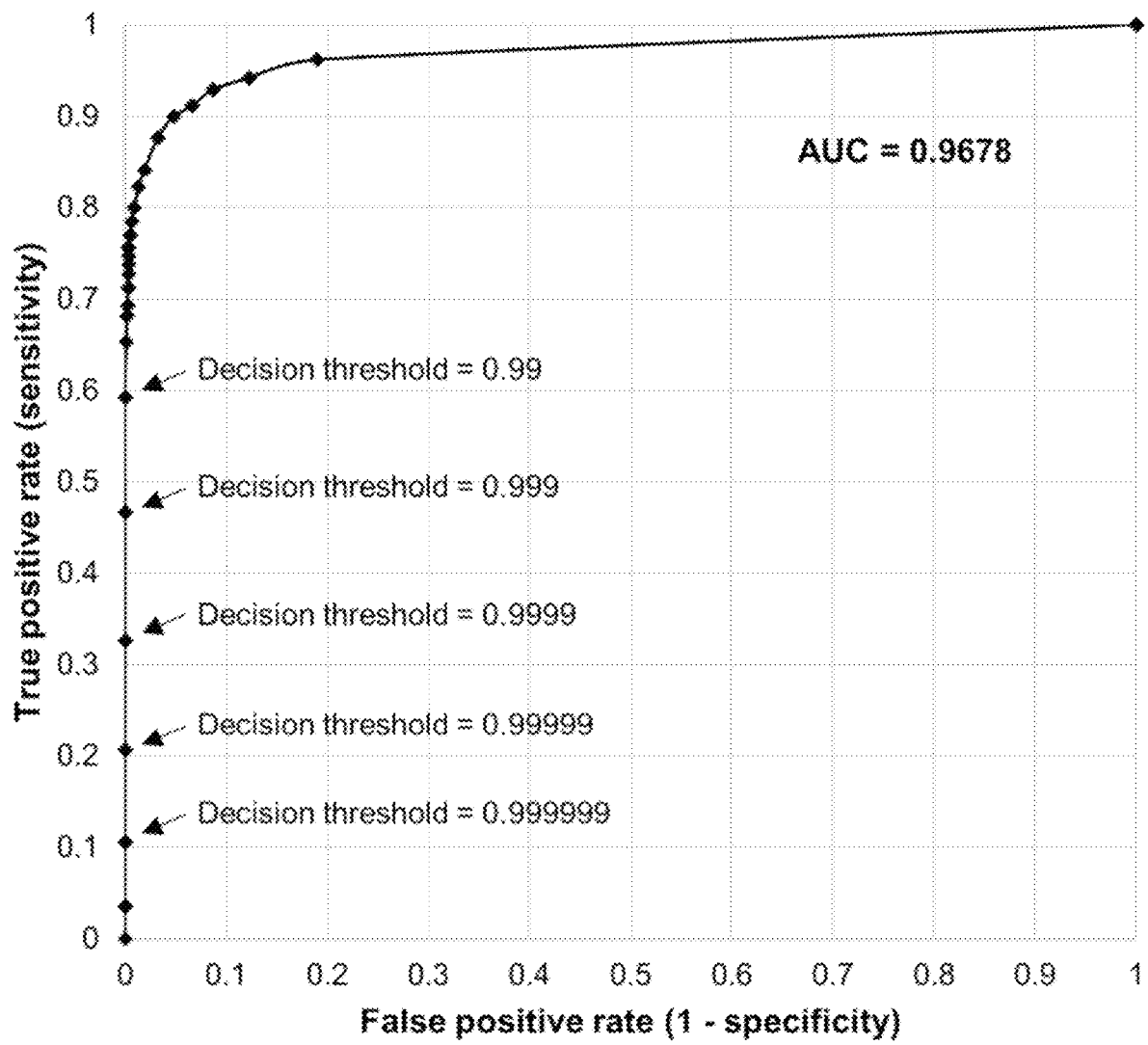
FIG. 9 illustrates the receiver operating characteristic (ROC) curve of the trained P3D CNN classifier. The curve is generated by varying the decision threshold for positive classification using the validation dataset. The area under the curve (AUC) is 0.9678. The blind serial dilution testing experiments (FIG. 5) are not used to calculate the AUC, because for those tests the ground truth concentrations are based on the dilution factor used during the spiking experiments. Manual labeling was not performed for the serial dilution testing data.

At a decision threshold of 0.999999, as expected, the TPR dropped down to 10.5% (refer to FIG. 9, which reports the receiver operating characteristic (ROC) curve based on the validation dataset, with an area under the curve of 0.9678). This low TPR results in underdetection of the target cells, as also evident in the serial dilution results (FIG. 5). The selection of the decision threshold is dependent on the specific application of interest and should be tuned based on the expected abundance of target cells and the desired LoD. For the application considered herein, because the expected number of target cells at the lowest concentration (i.e., 10 mL$^{-1}$) is extremely low, the decision threshold was tuned to a high level to suppress false positives, which in turn resulted in a very low TPR. However, for less demanding cell detection or cytometry applications where the desired LoD is not as stringent, the decision threshold may be relaxed to a lower level, which also allows the TPR to be higher.

Computation Time

Using the current computer code, which is not optimized, it takes ~80 s to pre-process the data within one FOV (corresponding to a volume of 14.7 mm$^2$×2 mm) for extracting the MCF7 cell candidates, corresponding to the preliminary screening step in FIGS. 4A-4G. For each detected cell candidate, it takes ~5.5 s to generate the input video for network classification. The network inference time for each input video is <0.01 s. Based on these numbers, if there are, e.g., ~1,500 cell candidates per experiment, the total processing time using the current computer code would be ~3.0 hours. However, it should be noted that the data processing time depends on various factors, including the computer hardware configuration, the cell concentration in the sample, the programming language and whether the code is optimized for the hardware. Here, although relatively high-performance hardware was used (an Intel Core i7 CPU, 64 GB of RAM, and an Nvidia GeForce GTX 1080Ti GPU) along some of the GPU functions provided by MATLAB (MathWorks, Natick, MA, USA), the code was not extensively optimized for improved speed. A careful optimization of the GPU code should bring a significant speedup in computation time.

COMSOL Simulation of the Magnetic Force Field Generated by the Electromagnet and the Permalloy Rods Because of space constraints, the electromagnet could not be placed sufficiently close to the imaging area, which caused the magnetic force to be low. A custom-machined rod 42 made of permalloy (relative permeability $\mu_r$~100,000) was used to relay the force field and enhance the relative magnetic force on target cells by ~40 times. A rod 42 was used for each electromagnet 24, 26. To simulate the magnetic force field distribution near an electromagnet with and without the permalloy rod, a finite element method (FEM) simulation was conducted using COMSOL Multiphysics (version 5.3, COMSOL AB, Stockholm, Sweden). A 3D model was developed using the magnetic field interface provided in the COMSOL AC/DC physics package. A stationary study was constructed based on the geometry of a commercially available electromagnet, where the core was modeled with a silicon steel cylinder (radius=3 mm, height=10 mm), and the coil was modeled with a surface current of 10 A/m on the side of the core running in the azimuthal direction. The permalloy rod was modeled using Permendur. A thick layer of air was added as a coaxial cylinder with a radius of 10 mm and a height of 30 mm. The magnetic flux density inside the simulation space was simulated using the magnetic field module. Then, a coefficient form PDE module in the mathematics library was used to derive the relative magnetic force field. The magnetic force that is received by superparamagnetic beads is given by:

$$F = \frac{V\chi}{\mu_0}(B \cdot \nabla)B \qquad (6)$$

where V is the volume of the magnetic particle, $\chi$ is the magnetic susceptibility, $\mu_0$ is the magnetic permeability in a vacuum, and B is the magnetic flux density.

Figure 7B:
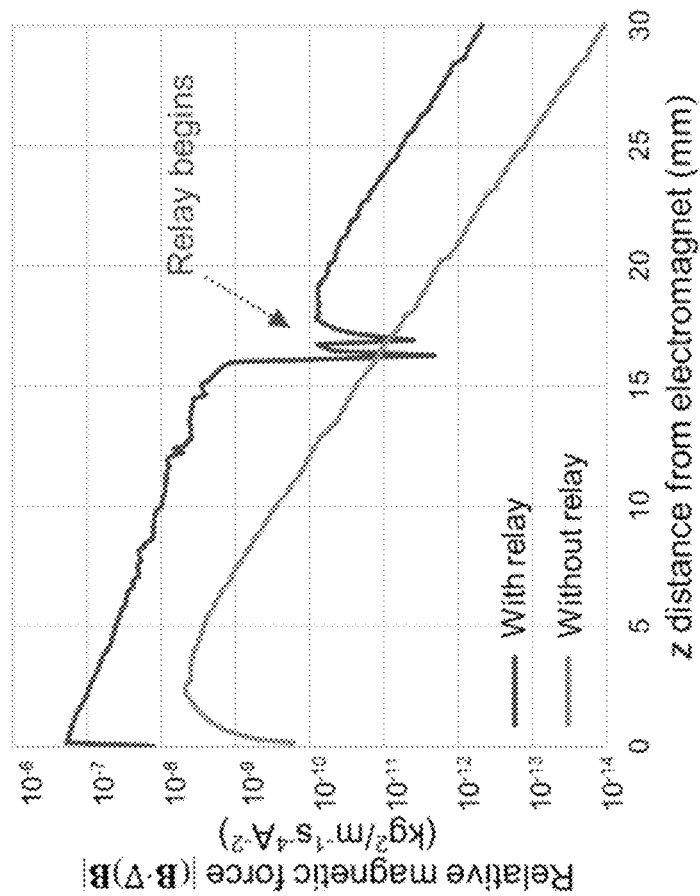
Figure 7A:
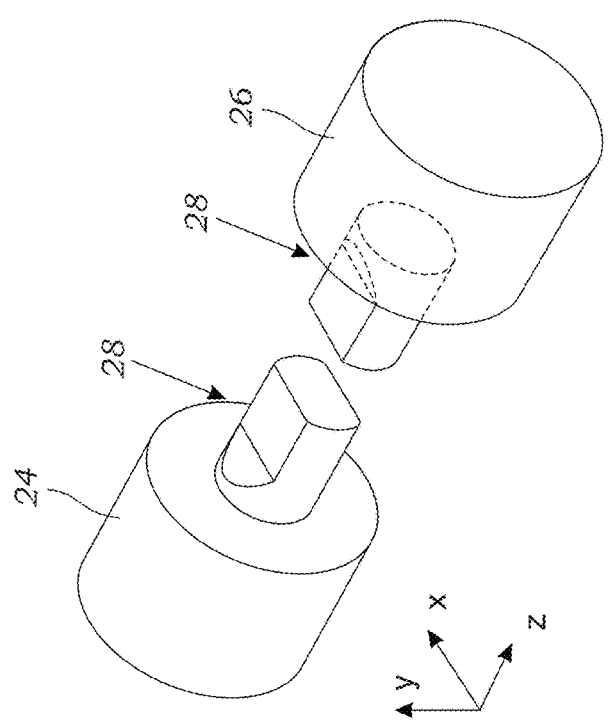
Figure 8:
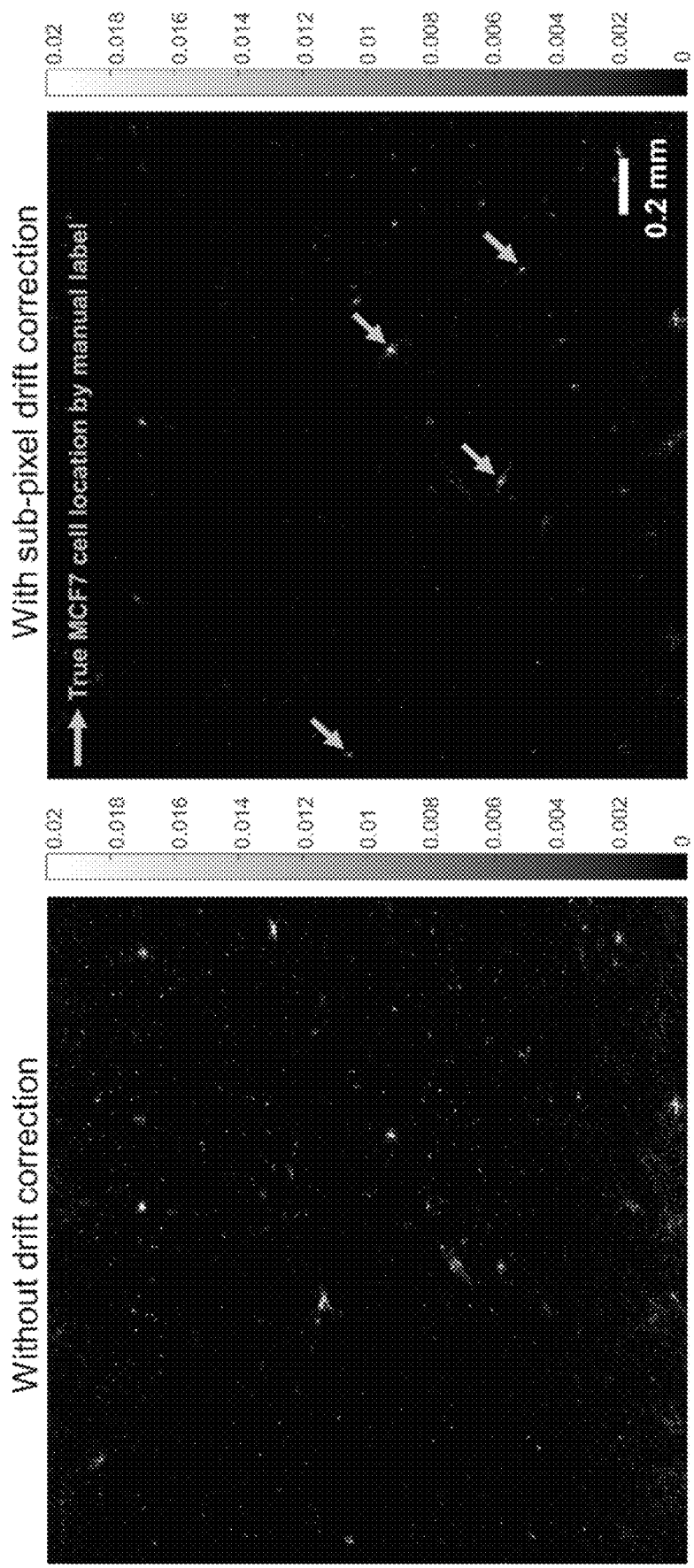
FIG. 8 illustrates the effect of using computational drift correction to remove false positives. Without drift correction, due to the drifting of the medium, particles that do not oscillate in response to the changing magnetic force field may generate contrast in the 2D contrast map, which reduces the effectiveness of the computational motion analysis. The sub-pixel drift correction step removes most of the "false positive" contrast.

The simulation results are shown in FIGS. 7B-7D. The results in FIG. 7B indicate that the relative magnetic force rapidly reduces as a function of the distance from the electromagnet. However, by using a permalloy rods 28, the relative magnetic force at the sample location is enhanced by ~40 times (FIGS. 7B and 7D).

High-Pass Filtered Back-Propagation Using the Angular Spectrum Method

The recorded holographic speckle images were back-propagated to different axial distances (i.e., z-distances) using the angular spectrum method with a high-pass filtered transfer function. Because the approximate size of the target cells of interest is known a priori, a high-pass filter was factored into the propagation transfer function in the spatial frequency domain, which was useful for suppressing noise and unwanted artifacts (i.e., larger objects outside of cell range not needed so these can be filtered out).

The free-space propagation transfer function is given by:

$$H(f_x, f_y; z) = \begin{cases} \exp\left[j\frac{2\pi z}{\lambda}\sqrt{1-(\lambda f_x)^2-(\lambda f_y)^2}\right], & \sqrt{f_x^2+f_y^2} \leq \frac{1}{\lambda} \\ 0, & \text{others} \end{cases} \quad (7)$$

where z is the distance to propagate, $\lambda$ is the wavelength of light, and $f_x$ and $f_y$ are spatial frequency coordinates. The high-pass filtered transfer function is modified based on H ($f_x$, $f_y$; z) as:

$$\tilde{H}(f_x,f_y;z) = H(f_x,f_y;z) \cdot \min\{G_1(f_x,f_y), G_2(f_x,f_y)\} \quad (8)$$

where $G_1$ and $G_2$ are the high-pass filters in the spatial frequency domain, given by $$G_1(f_x,f_y) = 1 - \exp[-\frac{1}{2}\sigma_1^2(f_x^2+f_y^2)] \quad (9)$$

and $$G_2(f_x,f_y) = 1 - \exp[-\frac{1}{2}\sigma_2^2 f_y^2] \quad (10)$$

where $\sigma_1$=50 μm and $\sigma_2$=117 μm. $G_1$ was used mainly to suppress the low-frequency interference patterns caused by the various interfaces in the light path, and $G_2$ was used mainly to suppress the unwanted diffraction patterns due to the grooves in the capillary tubes, which is a manufacturing artifact.

While embodiments of the present invention have been shown and described, various modifications may be made without departing from the scope of the present invention. For example, while one specific trained neural network has been used to classify objects, other machine learning algorithms implemented using image processing software 110 may be used to classify the candidate target object(s) as a target object or non-target object. In addition, the target object 90 may include single cells or clusters of cells. The invention, therefore, should not be limited, except to the following claims, and their equivalents.

What is claimed is:

1. A cytometer device comprising:
an optically transparent sample holder configured to hold a volume of sample therein, the volume of sample containing one or more objects therein with at least some of the one or more objects containing magnetic particles bound or conjugated thereto;
a moveable scanning head disposed adjacent to the optically transparent sample holder, the moveable scanning head comprising a lensless imaging module comprising one or more illumination sources configured to illuminate the sample holder from a first side and an image sensor disposed on a second side of the sample holder, the image sensor configured to capture a plurality diffraction patterns created by one or more objects within the volume of sample, the moveable scanning head further comprising a plurality of electromagnets located laterally adjacent to the lensless imagine module; and
a translation stage coupled to the moveable scanning head and configured to move the moveable scanning head along different regions of the optically transparent sample holder.

2. The cytometer device of claim 1, wherein the plurality of electromagnets comprise first and second electromagnets that are alternatingly driven 180° out of phase with respect to each other.

3. The cytometer device of claim 1, wherein the plurality of electromagnets are driven at a frequency between about 0.01 Hz and about 100 kHz.

4. The cytometer device of claim 1, wherein the optically transparent sample holder comprises one of a capillary, tube, flow cell, or microfluidic channel.

5. The cytometer device of claim 1, wherein the plurality of electromagnets each comprise respective permalloy rods associated therewith.

6. The cytometer device of claim 1, further comprising a computing device operatively connected to the cytometer device and configured to receive a plurality of images or video obtained by the image sensor.

7. The cytometer device of claim 6, the computing device further comprising image processing software configured to identify candidate objects of interest in the images or video and classify the objects of interest as a target object of interest or not a target object of interest.

8. The cytometer device of claim 7, wherein the image processing software performs drift correction prior to identifying candidate objects of interest.

9. The cytometer device of claim 7, wherein the image processing software inputs a plurality of images or video to a trained neural network to classify the objects of interest.

10. The cytometer device of claim 9, wherein the trained neural network comprises a fully connected trained neural network.

11. The cytometer device of claim 1, wherein the one or more objects comprise cells conjugated with magnetic particles.

12. The cytometer device of claim 1, further comprising one or more additional optically transparent sample holders, wherein each additional optically transparent sample holder is associated with a moveable scanning head disposed adjacent to the optically transparent sample holder, the moveable scanning head comprising a lensless imaging module comprising one or more illumination sources configured to illuminate the sample holder from a first side and an image sensor disposed on a second side of the sample holder, the image sensor configured to capture a plurality of diffraction patterns created by one or more objects within volume of sample, the moveable scanning head further comprising a plurality of electromagnets located laterally adjacent to the respective lensless imaging module.

13. A method of identifying one or more target objects among non-target objects within a sample comprising:
conjugating the one or more target objects with one or more magnetic particles;
loading an optically transparent sample holder with a sample containing the conjugated target object(s) and non-target objects;
applying an alternating magnetic field to the sample holder containing the sample;

illuminating the optically transparent sample holder with illumination from one or more light sources and capturing a plurality of images or video of diffraction patterns generated by the target object(s) and non-target objects within the sample while the alternating magnetic field is applied; and subjecting the plurality of images or video to image processing to identify candidate target object(s).

14. The method of claim 13, further comprising inputting images or video of the candidate target object(s) to a trained neural network that outputs a classification of the candidate target object(s) as a target object or non-target object.

15. The method of claim 13, further comprising inputting images or video of the candidate target object(s) to a machine learning software algorithm that outputs a classification of the candidate target object(s) as a target object or non-target object.

16. The method of claim 13, wherein the image processing software performs drift correction prior to identifying candidate target object(s) of interest.

17. The method of claim 14, wherein the trained neural network comprises a fully connected trained neural network.

18. The method of claim 13, wherein the target object comprises a cell or cluster of cells.

19. The method of claim 18, wherein the target object comprises a cancer cell or cluster or cancer cells.

20. The method of claim 13, wherein the target object comprises a cell or cluster of cells of a particular phenotype, morphology, shape, size, or genotype.

* * * * *